(12) United States Patent
Kemp

(10) Patent No.: US 8,438,158 B2
(45) Date of Patent: May 7, 2013

(54) CITATION INDEX INCLUDING SIGNALS

(75) Inventor: Richard Douglas Kemp, Atlantic City, NJ (US)

(73) Assignee: Bloomberg Finance L.P., New York, NY (US)

( * ) Notice: Subject to any disclaimer, the term of this patent is extended or adjusted under 35 U.S.C. 154(b) by 736 days.

(21) Appl. No.: 12/208,408

(22) Filed: Sep. 11, 2008

(65) Prior Publication Data
US 2009/0144301 A1 Jun. 4, 2009

Related U.S. Application Data

(63) Continuation of application No. 11/947,410, filed on Nov. 29, 2007, now Pat. No. 8,332,384.

(51) Int. Cl.
*G06F 7/00* (2006.01)
(52) U.S. Cl.
USPC .......................................... 707/726; 715/206
(58) Field of Classification Search .................. 707/830, 707/726; 715/206, 209
See application file for complete search history.

(56) References Cited

U.S. PATENT DOCUMENTS

| | | | |
|---|---|---|---|
| 7,246,310 B1* | 7/2007 | Wolfe | 715/236 |
| 2002/0156760 A1 | 10/2002 | Lawrence et al. | |
| 2006/0095426 A1 | 5/2006 | Takachio et al. | |
| 2006/0112084 A1* | 5/2006 | McBeath et al. | 707/3 |
| 2006/0149720 A1 | 7/2006 | Dehlinger | |
| 2006/0287971 A1* | 12/2006 | Armstrong | 707/1 |
| 2007/0255686 A1 | 11/2007 | Kemp et al. | |
| 2008/0071803 A1* | 3/2008 | Boucher | 707/100 |
| 2009/0112859 A1* | 4/2009 | Dehlinger | 707/6 |

OTHER PUBLICATIONS

International Search Report dated Jan. 14, 2009, 1 pg.

\* cited by examiner

*Primary Examiner* — Amy Ng
(74) *Attorney, Agent, or Firm* — Jon E. Gordon; Frank J. DeRosa; Frommer Lawrence & Haug LLP

(57) ABSTRACT

A document, which may be referred to as a "citing document," may include citations to one or more cited documents. An index of such documents may be referred to as a citation index or citator. A citation may be preceded in a citing document by introductory text, which may be called a signal, and one or more entries in a citation index may indicate which signal, if any, introduced a recorded citation. Computerized systems and methods for causing such display are also provided.

6 Claims, 21 Drawing Sheets

110
100

Engberg v. Meyer, 820 P.2d 70 (Wyo. 1991)

Treatment                HN cert. denied    469 U.S. 1077
cert. denied    83 L.E.2d 516
cert. denied    105 S.Ct. 577
cert. denied    686 P.2d 541
   dissent     833 P.2d 508
                    835 P.2d 340
   dissent     835 P.2d 1093
   dissent     837 P.2d 1059
                    843 P.2d 609
   dissent     844 P.2d 1074
                    846 P.2d 683    9
                    847 P.2d 1024
followed        850 P.2d 601    5
                    850 P.2d 603

Search Terms: 200 mass 1    △ MAYNARD V. ROYAL WORCESTER CORSET CO., 200 MASS. 1, 85 N.E. 877 (1908) — 232
RESULT: Exception(s) Denied — 234

Analysis Summary
| + Positive: | 96 |
| △ Caution: | 1 |
| = Negative: | 0 |

Sort Cases By: Date Court Analysis

250 — Direct History | Citation Analysis — 252

1. △ Maynard v. Royal Worcester Corset Co., 200 Mass. 1, 85 N.E. 877 (1908) *denying the exception(s) in* — 244
   ☒ Unpublished Opinion — 246

242 — 240

See Description of Indicators for information on use of specific indicators or signals

Law Citator

Analysis Summary
| | Positive: | 96 |
| --- | --- | --- |
| | Distinguished: | 1 |
| | Caution: | 0 |
| | Statute: | 0 |
| | Negative: | 0 |

☑ MAYNARD v. ROYAL WORCESTER CORSET CO., 200 MASS. 1, 85 N.E. 877 (1908)
RESULT: EXCEPTION(S) DENIED

Sort Cases By: Date Court Analysis

| Direct History | Citation Analysis |

Citation Analysis (97 Cases)    View Context for all Cite References

1. ⊞ CITED (See also)    CALLAHAN v. CTR. FOR TECH COMM. No. 030174 (Ma. Super Dec. 8, 2005)
2. ⊞☒ DISCUSSED (See generally), Quoted    Commonwealth v. Howard, 62 Mass. App. Ct. 422, 816 N.E. 2d 1241 (2004)
3. ⊞ DISCUSSED, Quoted    Vezina v. Maloney & Wright Ins. Agency, Inc. 40 Mass. App Ct. 218, 662 N.E. 2d 721 (1996)
4. ☒ CITED    TENNARO v. RYDER SYS., INC., 832F. Supp. 494
5. ☒ CITED, Quoted    FREDERICK v. CONAGRA, INC., 713 F. Supp. 41
6. ⊞ CITED (See)    Jackson v. Action for Boston Community Dev., Inc., 403 Mass. 8, 525 N.E. 2d 411 (1988)
7. ⊞ CITED (See)    Campana v. Board of Directors of the Mass. Hous. Fin. Agency, 399 Mass. 492, 505 N.E. 2d 510 (1987)
8. ☒ CITED (See)    American Mechanical Corp. v. Union Machine Co. of Lynn, Inc., 21 Mass. App. Ct. 97, 485 N.E. 2d 680

FIG. 7

Direct History | Citation Analysis

Citation Analysis (97 Cases)   Hide Context for all Cite References

1. ⊞ CALLAHAN v. CTR FOR TECH TECH COMM. No. 030174 (Ma. Super Dec. 8, 2005)

CITED (See Also)

In Count III, the plaintiff seeks to recover for his termination without just cause. He asserts that he had an implied contract of employment and that he could not be terminated without just cause. A contract implied in fact may be found to exist from the conduct and the relations of the parties. *LiDonni, Inc. v. Hart*, 355 Mass. 580, 583 (1969), see also *Maynard v. Royal Worcester Corset Co.*, 200 Mass. 1 (1908) (existence of contract is question of fact for jury). The plaintiff asserts that based on the circumstances of his employment, including his "election" every year and his salary, he was not an at-will employee but rather had an implied contract for the duration of one year. Although I am skeptical of the plaintiff's ability to establish that he had such a contract, that is a question for the jury. Whether he was terminated for good cause is, likewise, a question to be determined by the jury. Therefore, the defendant's motion for summary judgment is denied as to the claims in Count III...

2. ⊞ Commonwealth v. Howard, 62 Mass. App. Ct. 422, 816 N.E. 2d 1241 (2004)

DISCUSSED (See generally), Quoted

Here, the evidence demonstrated that the defendant's earning capacity was sufficient to meet the support order. At the beginning of the three-year period covered by the complaint, the defendant was a thirty-three year old, well educated, white male. There was no evidence that suggested the defendant suffered from any mental health or physical impairments that prevented him from obtaining employment. To the contrary, the defendant's frequent, long distance moves and his ability to readily secure work at each location suggests the opposite, that he was and is a healthy young man, quite capable of working. Finally, the defendant's employment at C&S Wholesalers removes any doubt that the defendant was capable of working and further establishes that he had an earning capacity of at least $400 per week in 1997, the first year of the period at  issue [fn8]. See generally *O'Reilly's Case*, 265 Mass. 456, 458 (1929), quoting from *Maynard v.*

Points of Law

480

REMEDIES

452

LAW & HOLDINGS | CASE EXTRACTS 93087.1 ACTIONS TAKEN IN VIOLATION OF THE AUTOMATIC STAY PROVISIONS OF THE BANKRUPTCY CODE ARE VOID.

1) *Kalb v. Feuerstein*, 308 U.S. 433, 60 S.Ct. 343, 84L. Ed. 370 (1940) — 405

L-"The action of the Watworth County Court was not merely erroneous but was beyond its power, void and subject to collateral attack." — 484

H-"We think the language and broad policy of the Frazier-Lemke Act conclusively demonstrate that Congress intended to, and did deceive the Wisconsin County Court of the power and jurisdiction to continue or maintain in any manner the foreclosure proceedings." — 486

} 482

2) *Bustamante v. Cueva*, 371 F.3d 232 (5th Cir. 2004)

L-"Texas law has long held that foreclosures in violation of the automatic stay are invalid, even if the parties did not have notice of the bankruptcy, unless retroactive relief from the stay is granted by the court."

93087.2 ACTIONS TAKEN IN VIOLATION OF THE AUTOMATIC STAY PROVISIONS OF THE BANKRUPTCY CODE ARE VOIDABLE.

1) *Chapman v. Bituminous Insurance Co.*, 345 F. 3d 338 (5th Cir. 2003)

L-"We adhere to the view that violations are merely "voidable" and are subject to discretionary "cure""
  H-"We hold today that Chapman may pursue his judgment against third parties such as Coho's insurers".

LawNotes

Antitrust & Trade

Restraint of Trade
Tests for Determining Prohibited Conduct under Sherman Act Section 1

Section 1 of the Sherman Act prohibits agreements that restrain trade. In interpreting and applying the statute, enacted in 1890, the federal courts have devoted time and effort to defining the parameters of the conduct it proscribes, *i.e.*, what constitutes an unlawful agreement in restraint of trade. Though the guidelines governing Section 1 analysis are far from truly static, three primary modes of analysis have developed–the rule of reason, the *per se* rule, and the "quick look" rule of reason. This LawNote briefly describes the history of and relationship between the three.

The Origins of the Rule of Reason

Judicial interpretation of Section 1 of the Sherman Act[1] begins with its statutory language that: "[e]very contract, combination in the form of trust or otherwise, or conspiracy, in restraint of trade or commerce among the several States, or with foreign nations" is unlawful. This broad language, taken literally, could be interpreted as condemning all agreements that effected any limitation whatsoever on trade. In the first two decades of antitrust enforcement (1890-1910), the federal government took an aggressive position on the prohibitions of the statute. In *United States v. Trans-Missouri Freight Ass'n*,[2] one of the earliest decisions under Section 1 of the Sherman Act, the Supreme Court sided with the government, holding that the statute's plain language condemned all agreements in restraint of trade, and explicitly rejecting the argument that only unreasonable agreements were prohibited.[3] in *United States v. Joint Traffic*...

FIG. 21

| 90) Previous Screen | 92) Keyword | 93) Options | Document Viewer |
|---|---|---|---|
| SEC Regulations | | | |
| Regulation Analyst Certification (Regulation AC) | 17 C.F.R §§ 242.500-505 | | Regulation Analyst Certification, SEC Release Nos. 33-8193 and 34-47384; File No. S7-30-02 |
| Regulation Blackout Trading Restriction (Regulation BTR) | 17 C.F.R. §§245.100-104 | | Insider Trades During Pension End Blackout Periods, SEC Release Nos. 34-47225 and IC-25909; File No. S7-44-02 |
| SEC Adopted Releases | | | |
| NASD and NYSE Rulemaking: Relating to Corporate Governance | | | SEC Release No.34-48745; File Nos. SR-NYSE-2002-33, SR-NASD-2002-77, SR-NASD-2002-80, SR-NASD-2002-138, SR-NASD-2002-139 and SR-NASD-2002-141 |
| Disclosure Required by Sections 406 and 407 of the Sarbanes-Oxley Act of 2002 | See Supplementary Information in Release for C.F.R. Sections Affected | | SEC Release Nos. 33-8177 and 34-47235; File No. S7-40-02 |
| Strengthening the Commission's Requirements Regarding Auditor Independence | See Supplementary Information in Release for C.F.R. Sections Affected | | SEC Release Nos. 33-8183; 34-47265, 35-27642, IC-25915 and IA-2103; File No. S7-49-02 |
| Disclosure of Equity Compensation Plan Information | See Supplementary Information in Release for C.F.R Sections Affected | | SEC Release Nos. 33-8048 and 34-45189; File No. S7-044-01 |
| Management's Reports on Internal Control Over Financial Reporting and Certification of Disclosure in Exchange Act Periodic Reports | See Supplementary Information in Release for C.F.R. Sections Affected | | SEC Release Nos. 33-8238, 34-47986, IC-26068; File Nos. S7-40-02 and S7-06-03 |
| Management's Report on Internal Control Over Financial Reporting and Certification of Disclosure in Exchange Act Periodic | See Supplementary Information in release for C.F.R. Sections Affected | | SEC Release Nos. 33-8618 and 34-52492; File Nos. S7-40-02 and S7-06-03 |

CITATION INDEX INCLUDING SIGNALS

CROSS-REFERENCE TO RELATED APPLICATIONS

This application is a continuation of U.S. patent application Ser. No. 11/947,410, filed Nov. 29, 2007, now U.S. Pat. No. 8,332,384, and titled "Creation and Maintenance of a Body of Knowledge Using Normalized Terminology." This application is also related to pending U.S. patent application Ser. No. 11/412,315, filed Apr. 26, 2006, and titled "System and Method for Topical Document Searching," which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyrights whatsoever.

BACKGROUND

The volume of readily available information related to any field continues to grow, and the rate of growth is accelerating. The capacities to organize and index this information have not kept pace, however. It has consequently become more likely that information precisely responsive to any need exists, while it has become less likely that anyone needing that responsive information will be able to find it.

The legal field has long and acute experience with these problems. Increased resort to the courts to address questions of public policy has had the consequence of increasing the volume of precedent that must be assimilated. The growth of the regulatory state has meant an increase in the number of regulations and administrative rulings. And the consequences of overlooking any applicable legal authority can be dire.

Before the coming of the personal computer, legal practitioners developed elaborate systems for organizing, indexing, and retrieving information. Among the elements of such systems are headnotes, which are annotations that state the major points of a judicial opinion; digests, which organize by subject headnotes collected from many opinions; and citators, which index the citations between documents. Headnotes, digests, and citators remain in wide use.

As in other fields, legal practitioners have applied computers and computer networks to the problems in managing information. Databases of legal information, containing, e.g., opinions, headnotes, digests, and other secondary material are available through networks of computers.

BRIEF SUMMARY OF THE INVENTION

The invention relates to the organization, maintenance, and use of a body of knowledge and computer systems and methods applicable thereto. More specifically, it relates to the identification of principles that make up the body of knowledge, creation of standard expressions of the principles, and arrangement of the expressions within a framework within which information, in the form, e.g., of documents, can be associated with the principles that it relates to. It further relates to systems and methods for classifying, storing, searching for, retrieving, and presenting information organized within that framework.

According to an embodiment of the invention, an outline can be provided, e.g., for a field of knowledge, study, and/or endeavor. The outline may be associated with and/or accompanied by a collection of documents related to the outlined field. The outline may take the form, for example, of a hierarchical list of topics (a "topic hierarchy"), wherein one or more topics may each comprise one or more respective subtopics, which may in turn comprise further subtopics, etc.

In connection with an embodiment of the invention, documents within the collection may refer to (e.g., cite) and/or otherwise be associated with others within the collection. As a special case of the foregoing, some documents may be created, e.g., to describe and/or survey one or more topics and/or subtopics within the topic hierarchy and to do so with reference to one or more other documents within the collection. These references and/or other associations may be used, e.g., to define sub-collections within the larger collection, and searching may be supported within such sub-collections. Such sub-collections may also be associated with a topic and/or subtopic through use of a document known to be associated with the topic and/or subtopic as the basis for building one such collection.

Additionally, in an embodiment of the invention, associations between documents may be, e.g., indexed to create a citator. Besides recording the simple association between one document and another, however, a citator according to an embodiment of the invention may record the form and/or substance of the association, and, according to a further embodiment of the invention, some or all of this information may be expressed in standard terms, which may differ from the actual terms used in any or all of the documents. Such standard terms, or "standard expressions" may in an embodiment of the invention be collected and organized, e.g., according to the topic hierarchy, and, in an embodiment of the invention, such organization is used to create a synopsis of the entire field.

Although the invention is of general applicability, particular attention is given herein to the application of the invention to legal information.

Thus, according to an embodiment of the invention, a method is provided of providing a synopsis of a body of knowledge. The method comprises storing within at least one electronic database a representation of a topic hierarchy that comprises a plurality of topics related to the body of knowledge, at least one topic comprising one or more subtopics, and at least one subtopic further comprising one or more subtopics. The method also comprises, for each of a plurality of documents, at least one of which is a citing document that includes at least one citation to at least one of the plurality of documents, finding at least one statement within the document that expresses a principle related to the body of knowledge, and, for each of the principles identified in any one or more of the documents, creating a standard expression of the principle and storing the created expression within the at least one electronic database in relation to at least one of the subtopics and in relation to each of the documents in which the identified principle was expressed.

According to an embodiment of the invention, each of the standard expressions expresses a rule of law.

According to another embodiment of the invention, the method comprises finding, within a citing document, a citation to one other document of the plurality of documents and a statement, associated with the citation, that is substantially equivalent to one of the standard expressions; and storing the citing document in relation to the other document and in relation to the subtopic that is related to the standard expression. In an embodiment of the invention, the method comprises providing an indication that the citing document includes the citation to the one other document and an identification of the standard expression.

According to an embodiment of the invention, a method is provided of providing a citation index. The method comprises finding within a first document a first expression of a principle, storing within the at least one database a first association between the first document and a standard expression of the principle, finding within a second document a second expression of the principle and a citation to the first document, the citation being associated with the second expression of the principle, storing within the at least one database a second association between the second document and the standard expression of the principle and a third association between the second document and the first document, and providing an indication that the second document includes the citation to the first document and an identification of the standard expression of the principle.

In an embodiment of the invention, the method comprises storing within the at least one database, in association with the standard expression of the principle, information indicating a treatment within the second document of the first expression of the principle; and providing an indication of the treatment and an identification of the first document. In an alternative embodiment of the invention, the method comprises storing within the at least one database a fourth association between the standard expression of the principle and a subtopic within a topic hierarchy that comprises a plurality of topics related to a body of knowledge, at least one topic comprising one or more subtopics, and at least one subtopic further comprising one or more subtopics.

In connection with the foregoing embodiments of the invention, the expressed principle may be a rule of law. In connection with the foregoing embodiments of the invention, one or more of the documents may be judicial opinions.

According to an embodiment of the invention, a system is provided for providing a synopsis of a body of knowledge. The system comprises a programmable processor, an input device that provides input to the system, a database, and a memory. The memory stores instructions that, when executed by the processor, cause the system to carry out a method that comprises storing within the at least one database a representation of a topic hierarchy that comprises a plurality of topics related to the body of knowledge, at least one topic comprising one or more subtopics, and at least one subtopic further comprising one or more subtopics; for each of a plurality of documents, receiving first input through the input device designating at least one statement within the document that expresses a principle related to the body of knowledge; and for each of the principles designated in any one or more of the documents, receiving second input, through the input device, that indicates a standard expression of the principle and, in response to the second input, storing that expression within the at least one database in relation to at least one of the subtopics and in relation to each of the documents in which the principle was expressed.

According to an embodiment of the invention, each standard expression expresses a rule of law. According to an alternative embodiment of the invention, the method comprises receiving third input through the input device, designating within a citing document a citation to one of the documents, a statement that is substantially equivalent to one of the stored standard expressions, and an association between the citation and the statement; and storing the citing document in the at least one database in relation to the cited document and in relation to the subtopic that is related to the standard expression.

According to an embodiment of the invention, the method comprises providing an indication that the second document includes the citation to the first document and an identification of the standard expression.

According to an embodiment of the invention, a system is provided for providing a citation index. The system comprises a programmable processor, an input device that provides input to the system, a database, and a memory. The memory stores instructions that, when executed by the processor, cause the system to carry out a method that comprises accepting first input through the input device designating within a first document a first expression of a principle; storing within the at least one database a standard expression of the principle; storing within the at least one database a first association between the first document and the standard expression of the principle; accepting input through the input device designating within a second document a second expression of the principle and a citation to the first document, the citation being associated with the second expression of the principle; storing within the at least one database a second association between the second document and the standard expression of the principle and a third association between the second document and the first document; and providing an indication that the second document includes the citation to the first document and an identification of the standard expression of the principle.

According to an embodiment of the invention, the method comprises storing within the at least one database, in association with the standard expression of the principle, information indicating a treatment within the second document of the first expression of the principle; and providing an indication of the treatment and an identification of the first document. According to an alternative embodiment of the invention, the method comprises storing within the at least one database a fourth association between the standard expression of the principle and a subtopic within a topic hierarchy that comprises a plurality of topics related to a body of knowledge, at least one topic comprising one or more subtopics, and at least one subtopic further comprising one or more subtopics.

In connection with the foregoing embodiments of the invention, the expressed principle may be a rule of law. In connection with the foregoing embodiments of the invention, one or more of the documents may be judicial opinions.

According to an embodiment of the invention, a computer-readable storage medium is provided that is encoded with a data structure. The data structure comprises a representation of a topic hierarchy that comprises a plurality of topics related to a body of knowledge, at least one topic comprising one or more subtopics, and at least one subtopic further comprising one or more subtopics; a plurality of standard expressions, each expressing a principle related to the body of knowledge; for each of the standard expressions, at least one association between the respective standard expression and one of the subtopics; and for each of the standard expressions, at least one association between the respective standard expression and a document that includes subject matter associated with the body of knowledge, the document including at least one statement having a meaning that is substantially equivalent to the meaning of the respective standard expression.

According to an embodiment of the invention, each of the standard expressions expresses a rule of law. According to an alternative embodiment of the invention, the data structure comprises a plurality of associations among a plurality of documents, each association itself being associated with at least one of the standard expressions.

In an embodiment of the invention, a method is provided of displaying an entry in a citation index. The entry corresponds to at least one citation in a citing document that comprises text, and at least one of the citations identifies a cited document and is introduced in the text of the citing document by a signal. The method comprises retrieving from a computer-readable storage medium first information that identifies the citing document and second information that identifies the signal in the citing document that introduced the citation to the cited document and causing an electronic display device to display the entry, the entry being based on the first information and the second information and comprising identification of the citing document and identification of the signal. According to an embodiment of the invention, the entry includes the signal.

Embodiments of the invention also include systems, e.g., for providing displays and/or carrying out the methods described above. Such a system may comprise a programmable processor, an input device that provides input to the system, a database, and a memory. The memory may store instructions that, when carried out by the processor, cause the system to carry out a method such as described above.

BRIEF DESCRIPTION OF THE DRAWINGS

The invention is illustrated in the figures of the accompanying drawings, which are meant to be exemplary and not limiting, and in which like references are intended to refer to like or corresponding things.

FIG. 1 illustrates a presentation of the contents and layout of one kind of citator according to the prior art.

FIG. 4 depicts a display of direct history within an electronic citator such as may be provided in connection with an embodiment of the invention.

FIG. 5 depicts a display of indirect history within an electronic citator such as may be provided in connection with an embodiment of the invention.

FIG. 7 depicts an alternate display of indirect history within an electronic citator such as may be provided in connection with an embodiment of the invention.

FIG. 11 depicts an alternative presentation of the specific Points of Law depicted in FIG. 10 according to an embodiment of the invention.

FIG. 19 depicts a discussion Law Note according to an embodiment of the invention.

FIG. 21 depicts a directory Law Note according to an embodiment of the invention.

DETAILED DESCRIPTION OF THE PREFERRED EMBODIMENTS

Figure 2:
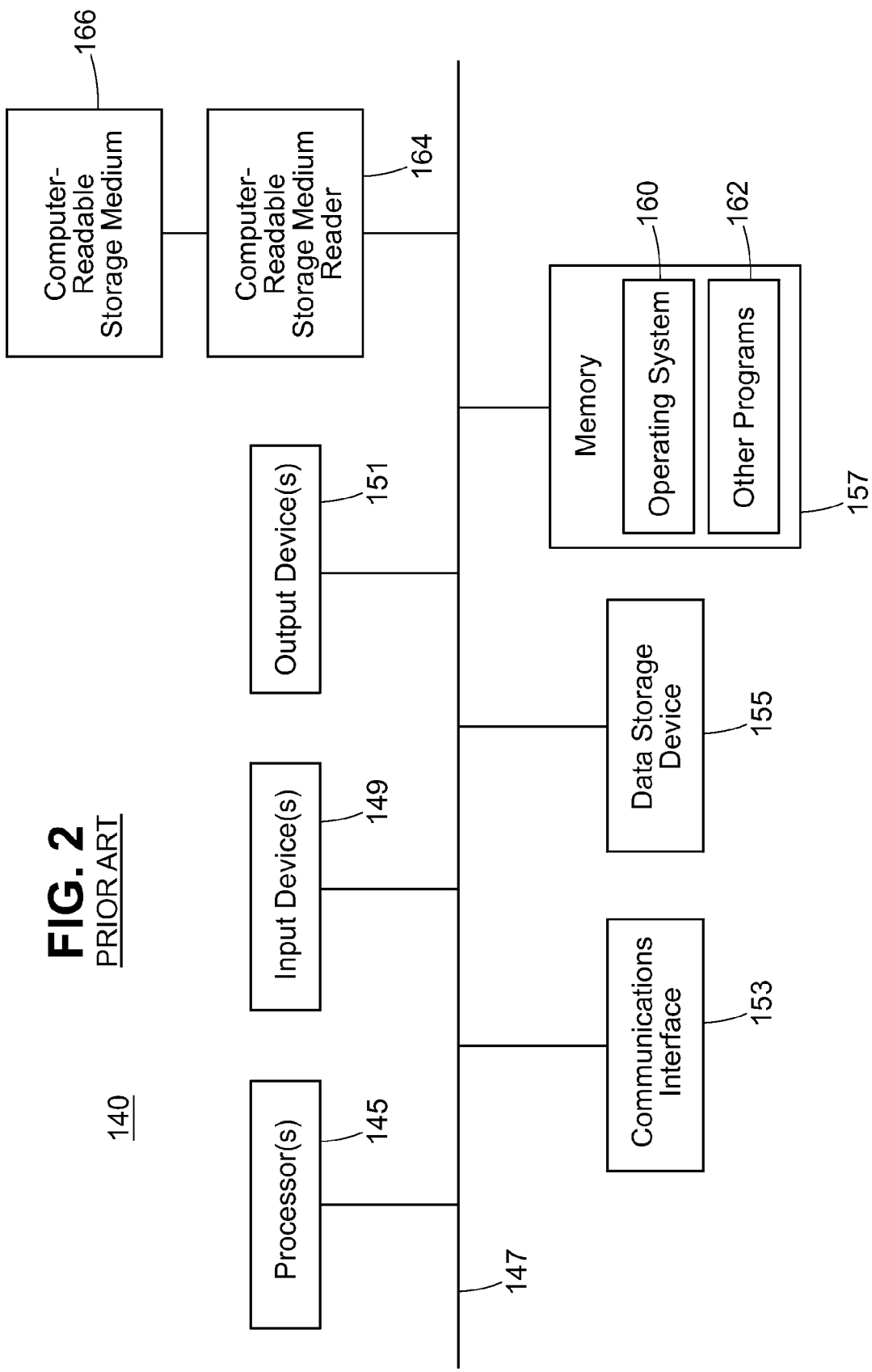
FIG. 2 is a block diagram of a programmable digital computer according to the prior art.

Embodiments of the invention provide systems and methods for assisting and enhancing research within bodies of knowledge. For example, one such body of knowledge is the law applicable in one or more jurisdictions, which may subsume, e.g., statutes, case law (e.g., judicial opinions), administrative regulations and orders, legislative history, commentary, treatises, journals, etc. The invention is illustrated herein through discussion of embodiments related to such legal information, and especially to opinions rendered by governmental adjudicative entities (e.g., courts and administrative agencies, among others), but this is exemplary, not limiting.

Published judicial opinions in the United States commonly begin with one or more numbered headnotes, each headnote restating a significant principle from the opinion that it annotates. Each headnote tends to be short, commonly only a single sentence. With rare exceptions, a headnote is added by a reporter or publisher, as a convenience for the reader, and thus lacks precedential value. As editorial additions to an opinion, moreover, headnotes may be protected by copyright.

For example, an opinion from a court disposing of a motion for summary judgment under the Federal Rules of Civil Procedure might recite the legal standard for granting such a motion. Rule 56(c) of the Federal Rules says when summary judgment is proper:

The judgment sought should be rendered if the pleadings, the discovery and disclosure materials on file, and any affidavits show that there is no genuine issue as to any material fact and that the movant is entitled to judgment as a matter of law.

To prepare the headnotes for an opinion, an editor typically reads the opinion, identifies the principles it states, and then writes a headnote for each principle. A summary judgment opinion might include a headnote such as the following:

[1] Summary judgment should be rendered if the pleadings, the discovery and disclosure materials on file, and any affidavits show that there is no genuine issue as to any material fact and that the movant is entitled to judgment as a matter of law.

Headnotes are typically prepared anew for each opinion, however, and often follow the language used by the opinion's author. Thus, a headnote expressing the same principle might in connection with another opinion read:

[1] Summary judgment should not be rendered unless the pleadings, the discovery and disclosure materials on file, and any affidavits show that there is no genuine issue as to any material fact and that the movant is entitled to judgment as a matter of law.

Still another headnote might read:

[1] Summary judgment is proper if there is no genuine issue as to any material fact.

Headnotes may be collected in a reference called a digest. Common digests include headnotes, from one or more jurisdictions, published within a specified time. The headnotes may be organized or indexed according to one or more attributes, such as legal subject matter, jurisdiction, and date, and each headnote is commonly accompanied by a citation allowing the reader to locate the opinion from which the headnote was taken. But because of the way headnotes are created, as discussed above, the sections of a digest that deal with basic principles of law commonly include page after page of substantially identical headnotes.

It is in some circumstances desirable to know if a document has been cited by other documents. In law, for example, a judicial opinion may appear on its face to be mandatory or persuasive authority for a particular legal principle. The effect of the decision represented by the opinion, however, may be diminished, or even negated entirely, by subsequent decisions. Conversely, a particular opinion may be judged to have special import if other opinions cite it often and favorably.

In law, an index of citing documents may be known as a "citator." FIG. 1 depicts an entry 100 in a representation of a citator according to the prior art. The entry comprises a caption 110, which in the depicted citator is in the form of a citation to the indexed opinion. As depicted, beneath the caption is a list 112 of opinions and/or other documents that cite the indexed opinion.

The list 112 comprises one or more items 114, each of which includes information in up to three columns. For any entry, the leftmost column 116 may hold a description of how the citing document treated the indexed opinion. Possible treatments resulting from further proceedings in the same or related cases (sometimes called the "direct history") include, for example, denial of discretionary review, affirmance, and reversal by an appellate court. Possible treatments in other, independent cases (sometimes called the "indirect history") include, for example, following the reasoning or rule of the indexed opinion, discussing the indexed opinion, criticizing it, declining to follow it, and overruling the previous decision. It is common for many items in the list 112 to omit treatment information.

The center column 118 holds an abbreviated citation to the citing document.

The rightmost column 120 may indicate the principle or principles for which the citing document referred to the indexed opinion. In the depicted citator, this indication takes the form of one or more numbers, where each number corresponds to one of the headnotes written for the opinion by the reporter of decisions. One or more list items 112 may have multiple headnote numbers, and one or more of them may have no headnote numbers at all.

The invention disclosed herein may be practiced using programmable digital computers. FIG. 2 is a block diagram of a representative prior art computer. The computer system 140 includes at least one processor 145, such as an Intel Core™ 2 microprocessor or a Freescale™ PowerPC™ microprocessor, coupled to a communications channel 147. The computer system 140 further includes an input device 149 such as, e.g., a keyboard or mouse, an output device 151 such as, e.g., a CRT or LCD display, a communications interface 153, a data storage device 155 such as a magnetic disk or an optical disk, and memory 157 such as Random-Access Memory (RAM), each coupled to the communications channel 147. The communications interface 153 may be coupled to a network such as the Internet.

One skilled in the art will recognize that, although the data storage device 155 and memory 157 are depicted as different units, the data storage device 155 and memory 157 can be parts of the same unit or units, and that the functions of one can be shared in whole or in part by the other, e.g., as RAM disks, virtual memory, etc. It will also be appreciated that any particular computer may have multiple components of a given type, e.g., processors 145, input devices 149, communications interfaces 153, etc.

The data storage device 155 and/or memory 157 may store an operating system 160 such as Microsoft Windows XP® or Vista™, Linux®, Mac OS®, or Unix®. Other programs 162 may be stored instead of or in addition to the operating system. It will be appreciated that a computer system may also be implemented on platforms and operating systems other than those mentioned. Any operating system 160 or other program 162, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 140 may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 164, such as, e.g., a magnetic disk drive, magneto-optical drive, optical disk drive, or flash drive, may be coupled to the communications bus 147 for reading from a computer-readable storage medium (CRSM) 166 such as, e.g., a magnetic disk, a magneto-optical disk, an optical disk, or flash RAM. Accordingly, the computer system 140 may receive programs and/or data via the CRSM reader 164. Further, it will be appreciated that the term "memory" herein is intended to include various types of suitable data storage media, whether permanent or temporary, including among other things the data storage device 155, the memory 157, and the CSRM 166.

Figure 3:
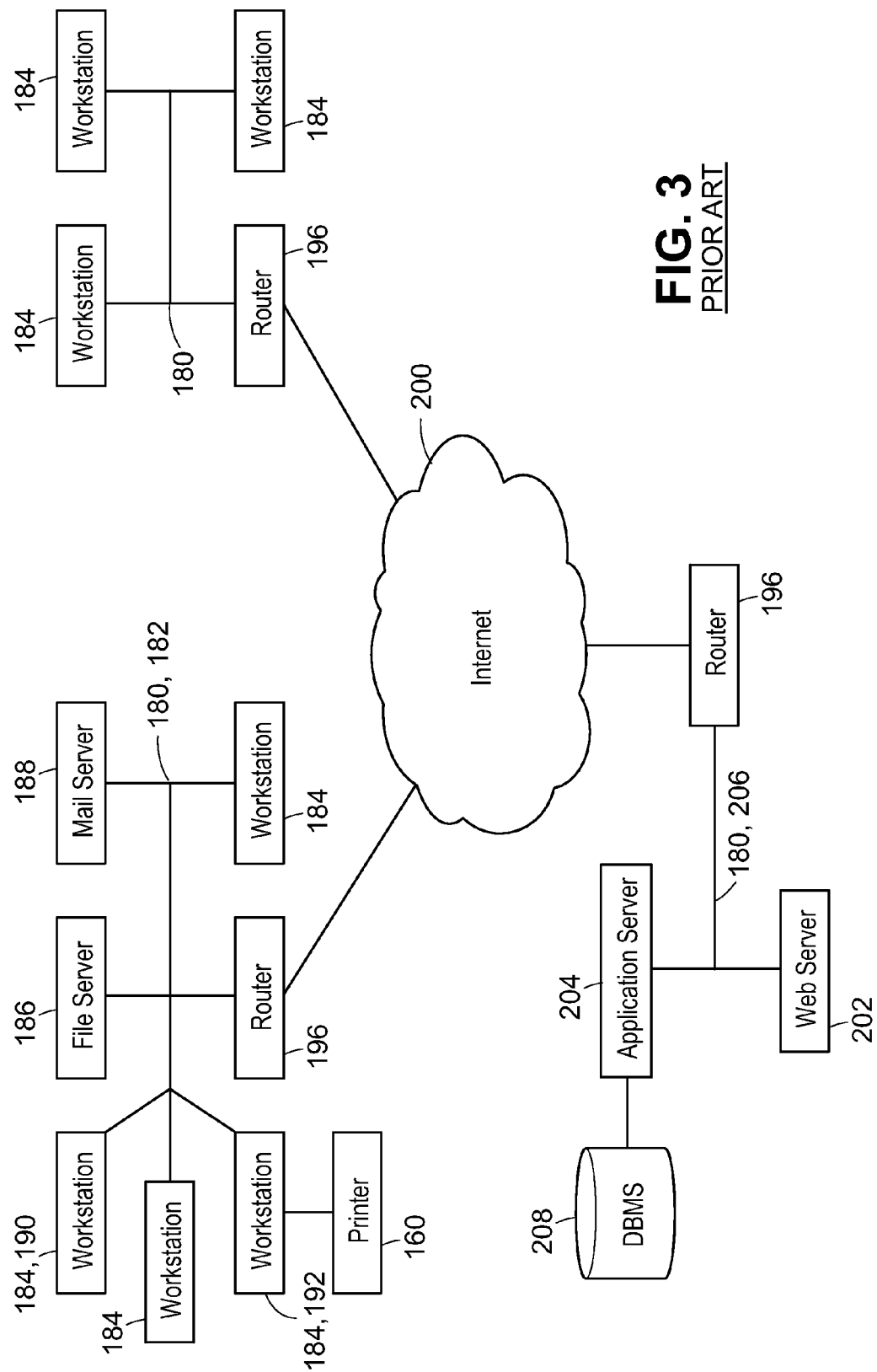
FIG. 3 is a block diagram depicting internetworked computer systems according to the prior art.

Two or more computer systems 140 may be connected, e.g., in one or more networks, via, e.g., their respective communications interfaces 155 and/or network interfaces (not depicted). FIG. 3 is a block diagram of representative prior art interconnected networks 180, such as may be useful in connection with embodiments of the invention.

A network 182 may, for example, connect one or more workstations 184 with each other and with other computer systems, such as file servers 186 or mail servers 188. The connection may be achieved tangibly, e.g., via Ethernet® or optical cables, or wirelessly, e.g., through use of modulated microwave signals according to the IEEE 802.11 family of standards. A computer system that participates in the network may send data to another computer system in the network via the network connection.

One use of a network 180 is to enable a computer system to provide services to other computer systems, consume services provided by other computer systems, or both. For example, a file server 186 may provide common storage of files for one or more of the workstations 190 on a network 182. A workstation 190 sends data including a request for a file to the file server 186 via the network 182 and the file server 186 may respond by sending the data from the file back to the requesting workstation 190.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

Further, a computer system may simultaneously act as a workstation, a server, and/or a client. For example, as depicted in FIG. 3, a workstation 192 is connected to a printer 194. That workstation 192 may allow users of other workstations on the network 182 to use the printer 194, thereby acting as a print server. At the same time, however, a user may be working at the workstation 192 on a document that is stored on the file server 186.

A network 182 may be connected to one or more other networks 180, e.g., via a router 196. A router 196 may also act as a firewall, monitoring and/or restricting the flow of data to and/or from a network 180 as configured to protect the network. A firewall may alternatively be a separate device (not pictured) from the router 196

A network of networks 180 may be referred to as an internet. The term "the Internet" 200 refers to the worldwide network of interconnected, packet-switched data networks that uses the Internet Protocol (IP) to route and transfer data. A client and server on different networks may communicate via the Internet 200. For example, a workstation 190 may request a World Wide Web document from a Web Server 202. The Web Server 202 may process the request and pass it to, e.g., an Application Server 204. The Application Server 204 may then conduct further processing, which may include, for example, sending data to and/or receiving data from one or more other data sources. Such a data source may include, e.g., other servers on the same network 206 or a different one and/or a Database Management System ("DBMS") 208.

Citator

FIG. 4 depicts an exemplary display 230 of direct history that an electronic legal citator may present in connection with an embodiment of the invention. The display comprises a citation 232 to the 1908 opinion (the "indexed opinion") of the Supreme Judicial Court of Massachusetts in the matter of *Maynard* v. *Royal Westchester Corset Co.*, in one form that is commonly used to identify legal opinions. The display 230 also comprises a summary 234 of the decision of the court that issued the indexed opinion.

The display 230 comprises an area 240 for presentation of the direct history. Within this area 240, a citation 242 to the indexed opinion may be presented along with one or more citations to other decisions in the case, thereby showing the context in which the opinion issued. One or more entries in the direct history may comprise an explanatory phrase that indicates the relationship between the associated entry and one or more other entries in the direct history.

Some decisions and opinions are unreported or otherwise unavailable. When an entry refers to such an unavailable resource, a placeholder 246 (e.g., "Unpublished Opinion") may indicate that a relationship involves such a resource.

The display 230 includes tabs to indicate the availability of multiple kinds of information. The tab 250 labeled "Direct History" includes text in boldface, which indicates that the direct history of the indexed opinion is currently displayed. The other tab 252, labeled "Citation Analysis," is a hyperlink to a display 260 of indirect history, such as FIG. 5 depicts.

The citator depicted in FIG. 5 comprises a list 265 of documents that cite the indexed opinion. A citation 267 to this opinion appears at the top of the display 260 in one form that is commonly used to identify judicial opinions. As depicted, the citation 267 is a hyperlink to the text of the indexed opinion (not depicted). This example also includes a brief statement 269 of the result that the court reached in the indexed opinion, presented just below the citation 267.

Figure 6:
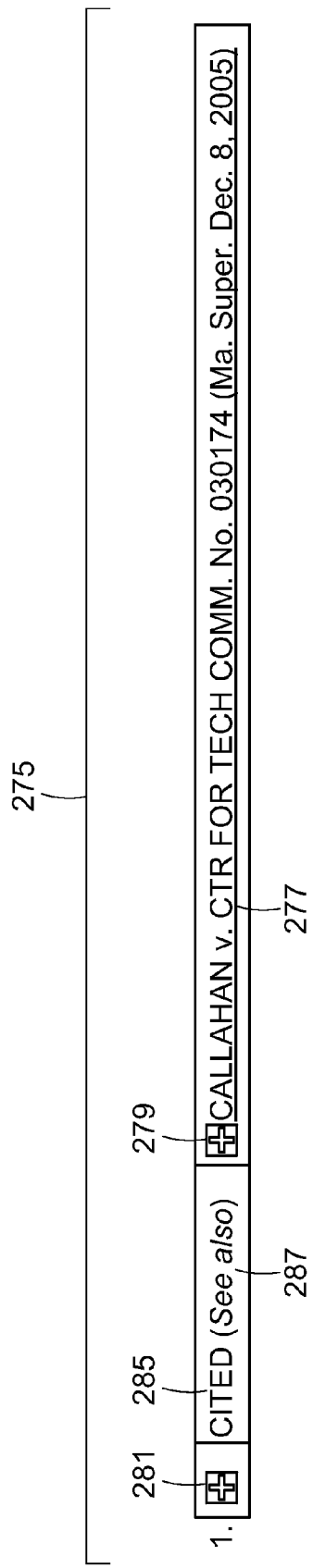
FIG. 6 depicts a display of an item of indirect history from the display depicted in FIG. 5.

As depicted in FIG. 5, the citator presents a list 265 of all opinions (the "citing opinions") that are known to have cited the indexed opinion, and FIG. 6 depicts a single entry 275 from that list. The entry 275 includes a citation 277 to the citing case in one form commonly used to identify judicial opinions. As depicted, the citation 277 is a hyperlink to the text of the citing opinion (not depicted). Adjacent to the citation 277 is a symbol 279 (e.g., "+" or "×") that may indicate the continued significance of the citing opinion in view of subsequent events. An alternative implementation of a citator may omit such an indication entirely or provide other indicia (e.g., annotation with one or more characters or words, color-coding, highlighting, and/or selection of a typeface and/or one or more attributes thereof for some or all of the entry) of the significance of a citing opinion in addition to or instead of one or more symbols as depicted in FIGS. 5 and 6.

As depicted in FIG. 6, an entry 275 includes a symbol 281 that indicates the citing opinion's treatment of the indexed opinion. The exemplary citator (FIG. 5) uses five symbols 281, and a key 283 to the meanings of the symbols is included in the display 260. For example, the plus sign ("+") in a green square 281, depicted in FIG. 6, indicates positive treatment, e.g., that the citing opinion explicitly indicated approval of indexed opinion or did so implicitly by accepting the authority or guidance of the indexed opinion.

The depicted entry 275 also describes the form of the reference within the citing opinion. For example, the depicted entry includes the description "CITED (See also)" 285. An entry 275 in a citator may variously comprise descriptions that indicate, e.g., that a citing opinion also discussed the indexed opinion or quoted a portion of it. As depicted in FIG. 6, the description 285 also indicates that the citation in the citing opinion was introduced by the words "See also" 287 which may be considered an example of a "signal."

Returning to FIG. 5, the display 260 includes a summary 290 of the citing opinions' treatment of the indexed opinion. The depicted example indicates that 97 opinions cited the cited the indexed opinion. Of the citing opinions, as indicated in the analysis summary 283, 96 treated the indexed opinion positively, and 1 treated the indexed opinion in a way that suggests caution in relying on the indexed opinion.

As depicted in FIG. 5, the entries are sorted by the dates of the citing opinions that they represent, with the most recently issued opinions listed first. Other sort keys may be used in an embodiment of the invention (not pictured) instead of or in addition to the date of the opinion, including, for example, one or more of the jurisdiction (e.g., federal court or one of the state courts), the court level (e.g., trial or appellate), and the opinion type (e.g., majority, per curiam, concurring, or dissenting), among other possibilities. Any one or more criteria, including for example any one or more of the preceding sort criteria, may also be used in an embodiment of the invention (not pictured) to break the list of citations into groups.

The display 260 (FIG. 5) includes a hyperlink 292 that leads to the modified display 300 depicted in FIG. 7. As depicted therein, each entry 275 in the citator is accompanied by an excerpt 302 from the citing opinion that includes the citation 304, providing context. A hyperlink 306 leads, e.g., back to the display 260 depicted in FIG. 5.

As depicted in FIGS. 5 and 7, either all citations are accompanied by excerpts, or none of them are. In an embodiment of the invention, one or more user interface components (not pictured) may be provided that allow excerpts to be displayed and/or hidden in connection with citations individually and/or in groups.

As discussed above, a citator may identify the aspect of the indexed opinion that the citing opinion refers to. For example, a citator may identify the page or pages of the indexed opinion that the citing opinion discusses. An alternative citator may refer to one or more points discussed in the indexed opinion, e.g., by including with the entry for each citing opinion an indication of the point or points discussed, such as a headnote number. In practice, these approaches can be expected to have similar results, and a particular citator may use either approach or a combination of the two.

In an embodiment of the invention, an alternative to headnotes is used. In such an embodiment, a plurality of opinions are selected that are judged respectively to express certain principles of law in a representative manner. The selection criterion or criteria may vary depending on the embodiment of the invention, but may include one or more of, for example, the quality of the writing, the degree to which the phrasing has been quoted elsewhere, and the importance and/or authority of the court.

According to this embodiment of the invention, such expressions may then be adopted, as-is or edited, as a standard by a publisher of a citator, who may then describe the propositions expressed in any opinion in terms of the selected standard of expressions. Following such an approach, a citator may then include in an entry for a citing opinion, again in terms of one or more of the standard of expressions, an indication of the citing opinion's treatment of one or more legal principles stated in the indexed opinion.

A selected standard expression can be taken as setting forth a Point of Law. Once a standard expression has been chosen, other opinions' statements on that point may be expressed in terms of the standard expression, e.g., by accepting the underlying principle, by rejecting it, or simply by discussing it. A citator according to an embodiment of the invention may rely on the identification of Points of Law within an indexed opinion; a citator entry for a citing opinion can indicate the Point or Points of Law within the indexed opinion that the citing opinion refers to. A user may then decide to examine only those citing opinions that refer to certain Points of Law. A citator according to an embodiment of the invention may additionally provide the Points of Law, e.g., as a list, that have been identified within a particular opinion. In addition to or instead of the foregoing, a citator may permit a user to restrict the citator display to only those citing opinions that refer to a selected Point of Law.

Figure 8:
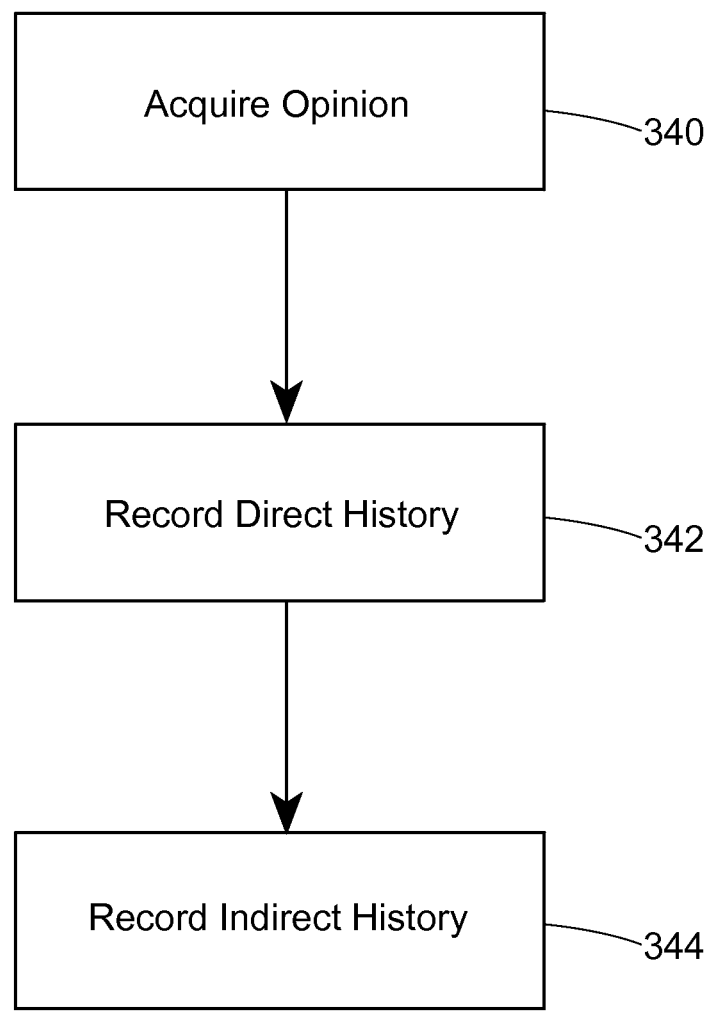
FIGS. 8 and 9 are flowcharts representing analysis of a new document for inclusion in a citator according to an embodiment of the invention.

FIG. 8 depicts a workflow for recording citator information according to an embodiment of the invention. As depicted, the workflow comprises acquiring 340 the text of a judicial opinion, e.g., in electronic form. In block 342, the opinion is associated with direct history information, and in block 344, the opinion is examined as possible indirect history.

Figure 9:
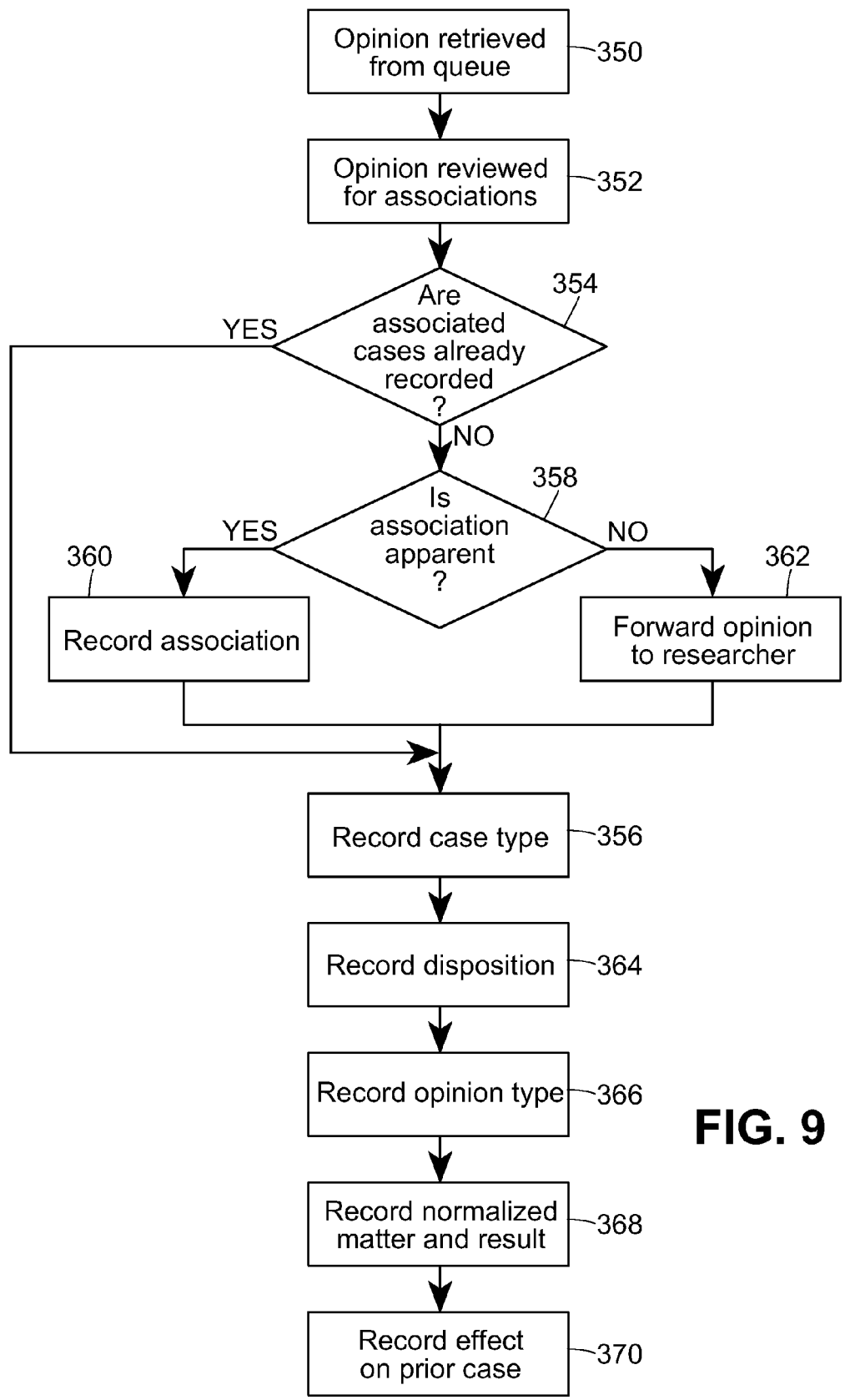

FIG. 9 depicts in greater detail the association of a newly-acquired opinion with direct history according to an embodiment of the invention. In block 350, the opinion is retrieved from a queue of opinions that await analysis, which may comprise, e.g., retrieving the text of the opinion from a data store. The text of the opinion may be stored electronically in association with metadata, and some or all such metadata may be retrieved and displayed in association with some or all of the text.

In block 352, the text is reviewed for any indication that this opinion is related to one or more other opinions. One such relationship might exist, for example, when multiple opinions issue in the same case. For example, an opinion regarding a motion for summary judgment may refer to the court's prior opinion denying a motion to dismiss the action. Similarly, the opinion of an appellate court may refer to the opinion of the court that made the appealed ruling.

Instead of or in addition to the foregoing, one case may involve the same controversy as another, despite being part of a different formal proceeding. For example, different heirs under the same will may bring separate actions to vindicate their own interests. Although neither case is strictly considered part of the other's direct history, an analyst according to an embodiment of the invention may record information associated with such controversies and may do so, e.g., as part of identifying relationships between opinions in the same case or by a similar method that is done separately.

If the metadata displayed in block 350 appears in block 354 to include information about all associated opinions, then the analyst may proceed to determine and record the type of decision in block 356. If not, the analyst determines in block 358 whether the appropriate associations are apparent on the face of the opinion. If the associations are apparent, then the analyst records them in block 360. If not, the analyst forwards the opinion to a researcher for further inquiry in block 362.

In an embodiment of the invention, the analyst records the case type in block 356. According to an embodiment of the invention, case types may include, for example, attorney disciplinary actions, bankruptcies, criminal prosecutions, civil suits, and tax proceedings, among many other possibilities. This recording may be conclusive or it may be provisional and subject to further review as the opinion is processed.

In block 364, it is recorded whether the opinion is nothing more than an announcement of a result, such as, e.g., "cert. denied" or "judgment affirmed." Similarly, in block 366, it is recorded whether the opinion is an unsigned opinion of the entire court (referred to as a "per curiam" opinion), or is signed by one or more judges.

In block 368, the matter and result of the opinion are recorded in normalized form according to an embodiment of the invention. Here, the "matter" may refer to the question before the court, in response to which the court issued the opinion, and the "result" may refer to the court's resolution of that question. Besides finding this information, however, block 368 may in an embodiment of the invention include recording the information in standard terms.

For example, a court may write: "The judgments of dismissal are reversed, and the cases are to stand for further proceedings." According to an embodiment of the invention, this is recorded as: "Judgment reversed, case remanded." Such normalization may also include revision of archaic terminology: "Plaintiff nonsuit" may, for example, become "case dismissed."

In block 370, the effect of the ruling on any prior rulings in the action are determined and recorded, e.g., affirming or reversing a lower court's decision.

According to an embodiment of the invention, an opinion is also reviewed for its role in the indirect histories of one or more other opinions. Such review may, for example, comprise automatic identification of all citations in the opinion followed by manual analysis of how the reviewed opinion treats the cited opinion. This treatment may be recorded, e.g., in normalized terminology, as may be any textual indicators (or "signals") that precede the cite and indicate, e.g., the relevance and/or importance of the cited reference.

Normalized Points of Law

Choosing standard expressions of Points of Law has been discussed so far in connection with an example of one possible embodiment of a citator. But it will be appreciated that the selection of standard expressions for reference by a citator may, depending on the body of documents covered by the citator, yield very many such expressions. Indeed, depending again on, e.g., the number, type, and scope of analyzed documents, the collected standard expressions may effectively describe one or more entire fields of law in one or more jurisdictions.

Thus, according to an embodiment of the invention, the substance of a legal principle is expressed in a standard form, e.g., a verbatim or edited version of an expression found in a judicial opinion. (Such a standard or normalized expression may be referred to herein as a "Point of Law.") Points of Law may, in an embodiment of the invention, be created in the course of developing a citator, but they need not be. A number of Points of Law may be collected, e.g., in a database, and the legal principles found in a plurality of legal opinions may be identified and associated with the stored Points of Law.

According to an embodiment of the invention, collected Points of Law may be organized within a hierarchy of topics and subtopics. For example, in connection with an embodiment of the invention, a Legal Topic Hierarchy is provided that includes a classification of legal topics which may, e.g., span some or all fields of U.S. law. One example of a Legal Topic Hierarchy includes a classification that includes about 120 broad fields of law (also referred to as "topics"), such as admiralty law, antitrust and trade, constitutional law, corporate law, and securities regulation. Each topic may then be divided into subtopics, each of which may contain further subtopics, and so on. The extent of the outline that the hierarchy represents varies with, e.g., the particular body of knowledge that is outlined and/or the expected use of the outline. For example, one exemplary Legal Topic Hierarchy may include more than 25,000 topics and subtopics.

Treated as a graph, in which each topic and subtopic is considered a node, the hierarchy is not quite a tree, because some subtopics may be found in several places in the tree. For example, in a Legal Topic Hierarchy, certain subtopics related to the Securities and Exchange Commission might be placed under both administrative law and securities regulation. A structure of this kind is sometimes called a "polyarchy."

Figure 10:
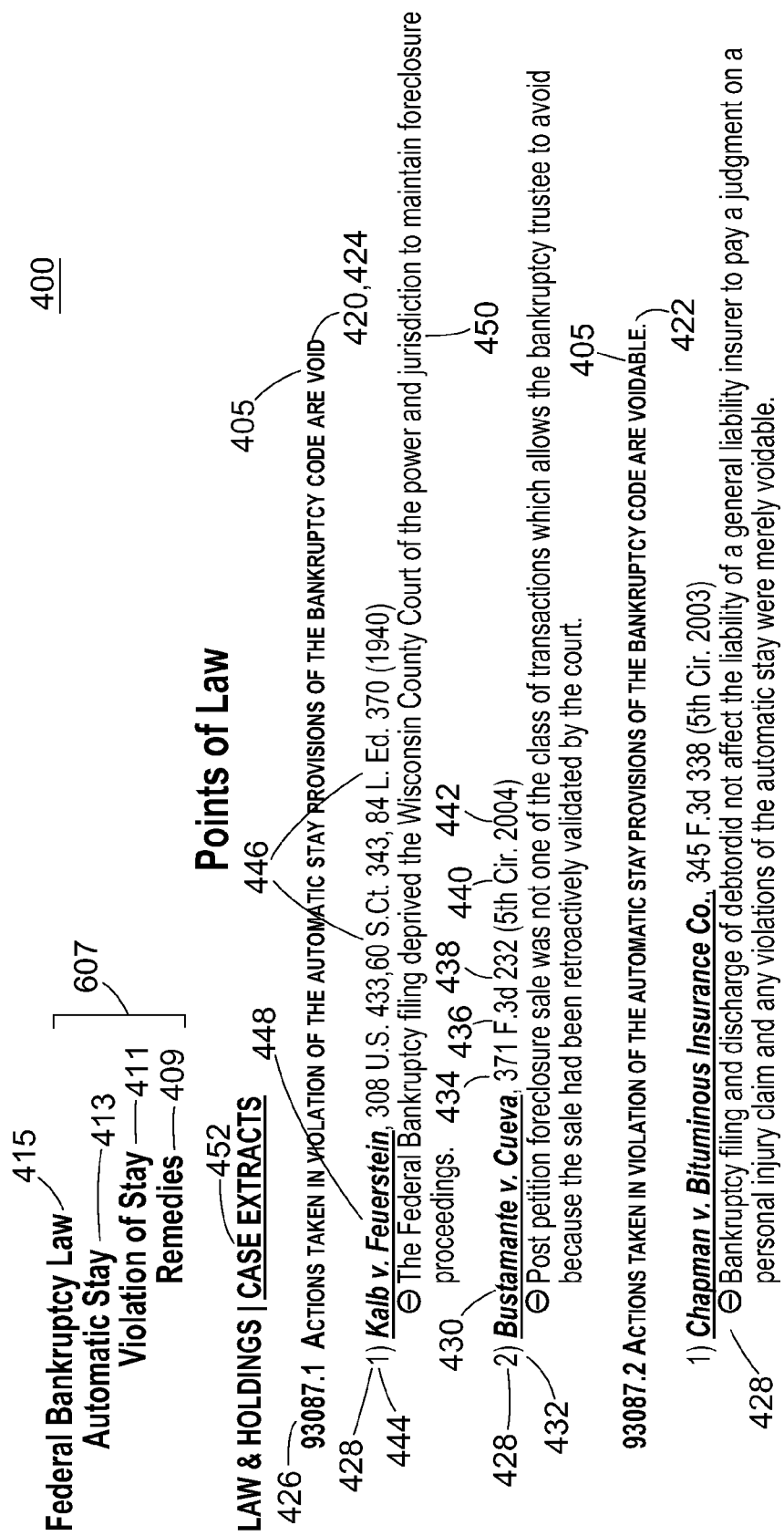
FIG. 10 depicts a presentation of Points of Law for a specific subtopic according to an embodiment of the invention.

In connection with such an embodiment, selection of a subtopic, e.g., as discussed below in connection with FIG. 15, may cause the display of the collected expressions of Points of Law that have been associated with that subtopics FIG. 10 depicts an example of such a display 400 according to an embodiment of the invention. In an embodiment of the invention, each of the Points of Law 405 is associated with, e.g., a subtopic within the topic hierarchy. The display 400, for example, indicates 407 that the displayed Points of Law 405 are associated with the subtopic "Remedies" 409, which is a subtopic of "Violation of Stay" 411, which is a subtopic of "Automatic Stay" 413, which is in turn a subtopic of the top-level topic "Federal Bankruptcy Law" 415.

As depicted in FIG. 10, the display 400 includes, as standard expressions, the different conclusions that have been reached by courts that have addressed the subtopic of "Remedies" 409 for violations of the automatic stay of pending actions that is imposed under federal bankruptcy law. So expressed, those conclusions are that "[a]ctions taken in violation of the automatic stay provisions of the Bankruptcy Code are void" 420 and, alternatively, that "[a]ctions taken in violation of the automatic stay provisions of the Bankruptcy Code are voidable" 422.

The information accompanying any Point of Law 405 may vary, depending, e.g., on the embodiment of the invention. As depicted in FIG. 10, for example, each Point of Law states a legal principle 424 and an index number 426 that may, e.g., uniquely identify the statement 424 within the synopsis. Below each Point of Law 405 and associated with it are one or more references 428 to authorities that advance that point. Each such reference 428 may include, e.g., a citation 430 to the opinion or other authority, which, for a judicial opinion, may include information such as the title of the case 432, a reference 434 to a volume of a reporter 436 and the page number 438 within that volume on which the indexed opinion begins, the court 440 that rendered the opinion, and/or the date 442 of rendering the opinion.

For example, as depicted in FIG. 10, a reference 444 is made to the decision of the U.S. Supreme Court in *Kalb v. Feuerstein*, which was rendered in 1940, and which may be found within volume 308 of the *United States Reports* beginning on page 433. The reference includes so-called "parallel citations" 446 to additional reporters in which the opinion has been published. In the depicted embodiment of the invention, the title 448 of the case is underlined, indicating that the title is a hyperlink to the indexed opinion. In an alternative embodiment of the invention, one or more other portions of the reference 444 may be hyperlinks instead of or in addition to the case title, and/or the hyperlinks may be indicated by other means in addition to or instead of underlining.

In the depicted embodiment of the invention, a reference may include, e.g., a summary and/or rephrasing 450 of the statement or action that relates to the Point of Law 405 associated with the reference 444. In an embodiment of the invention, the reference may include a portion of the text of the authority in which the Point of Law is discussed. In the depicted embodiment of the invention, it may be possible to select the information that appears with the reference. For example, the words "case extracts" 452 within the display 400 are a hyperlink that, when selected, may lead, e.g., to a display 480 such as depicted in FIG. 11. In this display 480, a Point of Law 405 includes, e.g., one or more quotations 482 from the opinion, which may express, for example, a legal principle 484 significant to the decision and/or Point of Law 405 and/or the holding 484 of the court on a question before it.

A synopsis of a body of knowledge, such as illustrated herein in connection with the particular application to Points of Law, may also be combined with other features. For example, the citations gathered under one or more Points of Law may serve as the basis for an ecosystem search as described below, instead of or in addition to one or more Law Notes. As another example, the synopsis can also be wholly or partially combined with one or more Law Notes, e.g., to provide editorial commentary upon the collected legal principles.

Legal Topic Hierarchy

A topic hierarchy, such as may be used, e.g., to organize Points of Law as discussed above, may be part of a framework for conceptually organizing material related to a field of knowledge. A computer system according to an embodiment of the invention may include a user interface that reflects such a hierarchy. Such an interface may then be used, e.g., to find and retrieve topical material.

Figure 12:
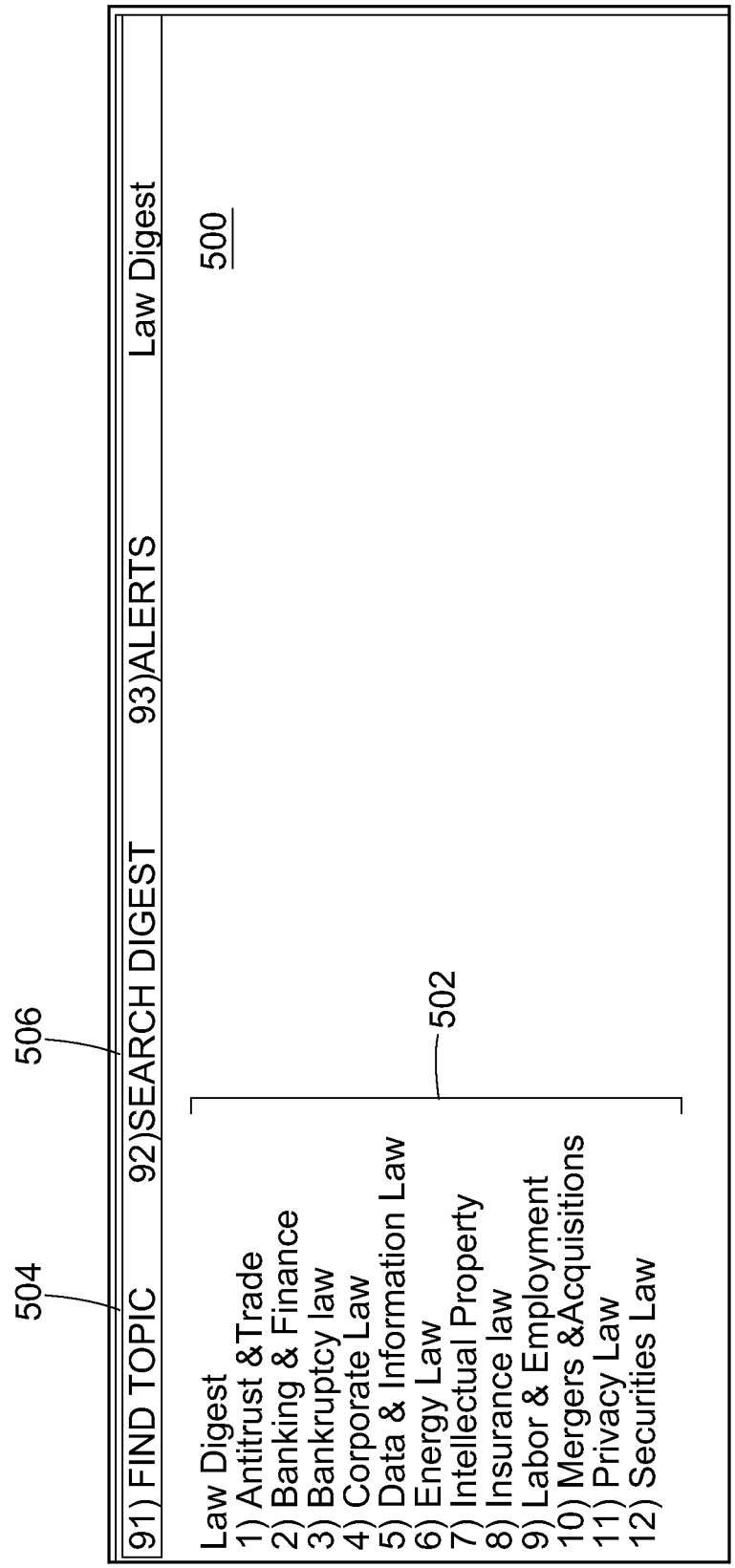
FIGS. 12-15 depict displays such as may be presented in the course of using a Legal Topic Hierarchy according to an embodiment of the invention.

FIG. 12 depicts a window 500 such as a computer system 140 (FIG. 2) may cause to appear on an output device 151 (FIG. 2), such as a computer monitor. The window 500 presents a hierarchical list 502 (or tree) of top-level legal topics such as may exist within a Legal Topic Hierarchy. A user may view subtopics within a top-level topic by selecting the desired top-level topic, e.g., via an input device 149 (FIG. 2). Depending on the configuration of the computer system, selecting a topic or other object may involve providing input, e.g., via a keyboard, touch screen, and/or pointing device, such as a mouse or trackball.

A window 500 may include one or more buttons or other controls that, when selected, may make certain functions available to a user. For example, from the window 500 depicted in FIG. 12, selection of the button 504 labeled "Find Topic" leads to another screen (not pictured), in connection with which a user may enter one or more criteria to be used in searching the hierarchy. Selection of the button 506 labeled "Search Digest" may lead to another screen (not pictured) in connection with which a user may enter one or more criteria to be used in searching some or all of the information indexed according to the topic hierarchy.

Figure 13:
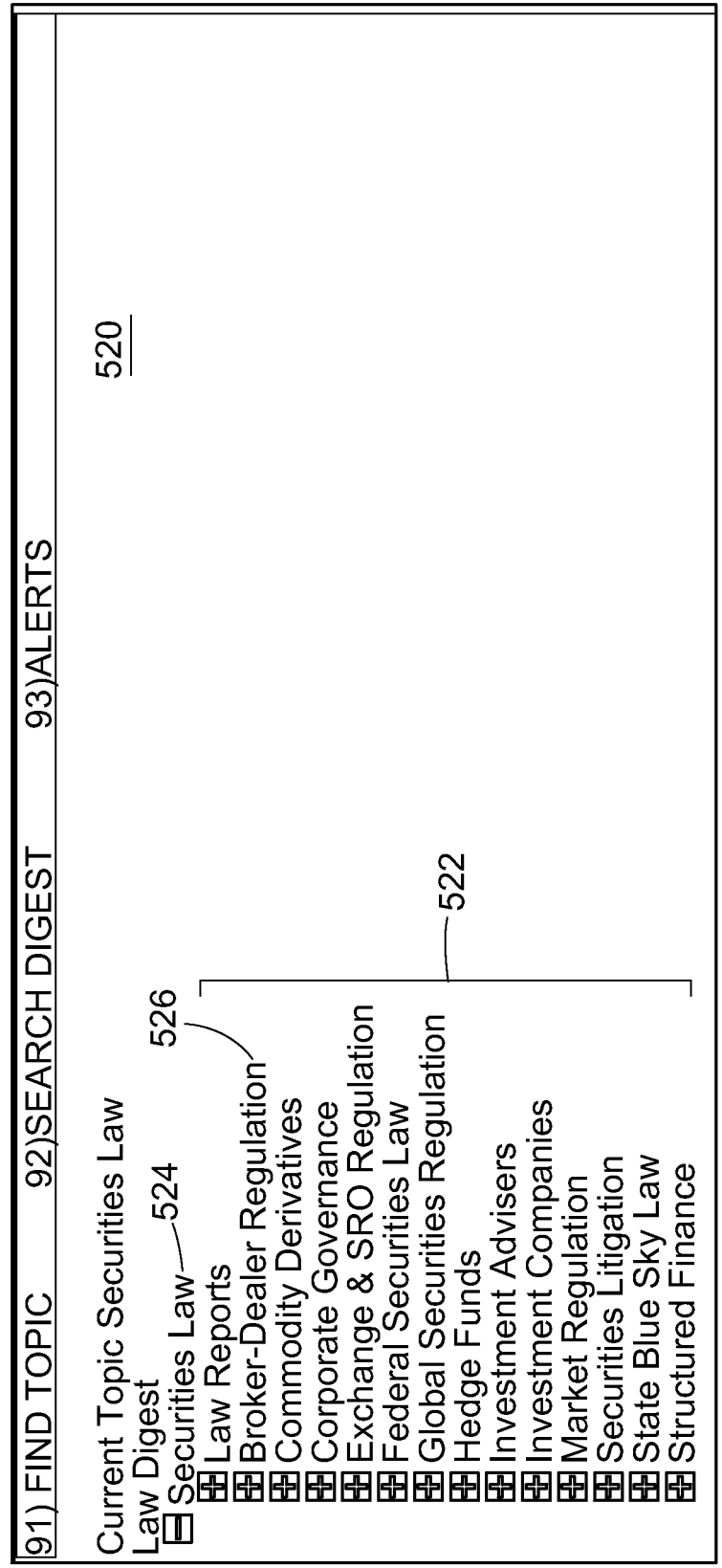

FIG. 13 depicts a window 520 that presents an example of a hierarchical list or tree of subtopics 522 directly beneath the topic "Securities Law" 524. This window 520 may appear, e.g., consequent to the user's selection of the topic labeled "Securities Law" from the list 502 in the window 500 depicted in FIG. 12. Selection of the subtopic labeled "Broker-Dealer Regulation" 526, may in turn lead, e.g., to a window 540 such as FIG. 14S depicts, in which a list or tree of second-level subtopics 542 appears under the selected first-level topic. As depicted, the presented window 540 includes a scroll bar control 544 to allow the user to see and possibly interact with information that does not fit in the provided space.

Figure 14:
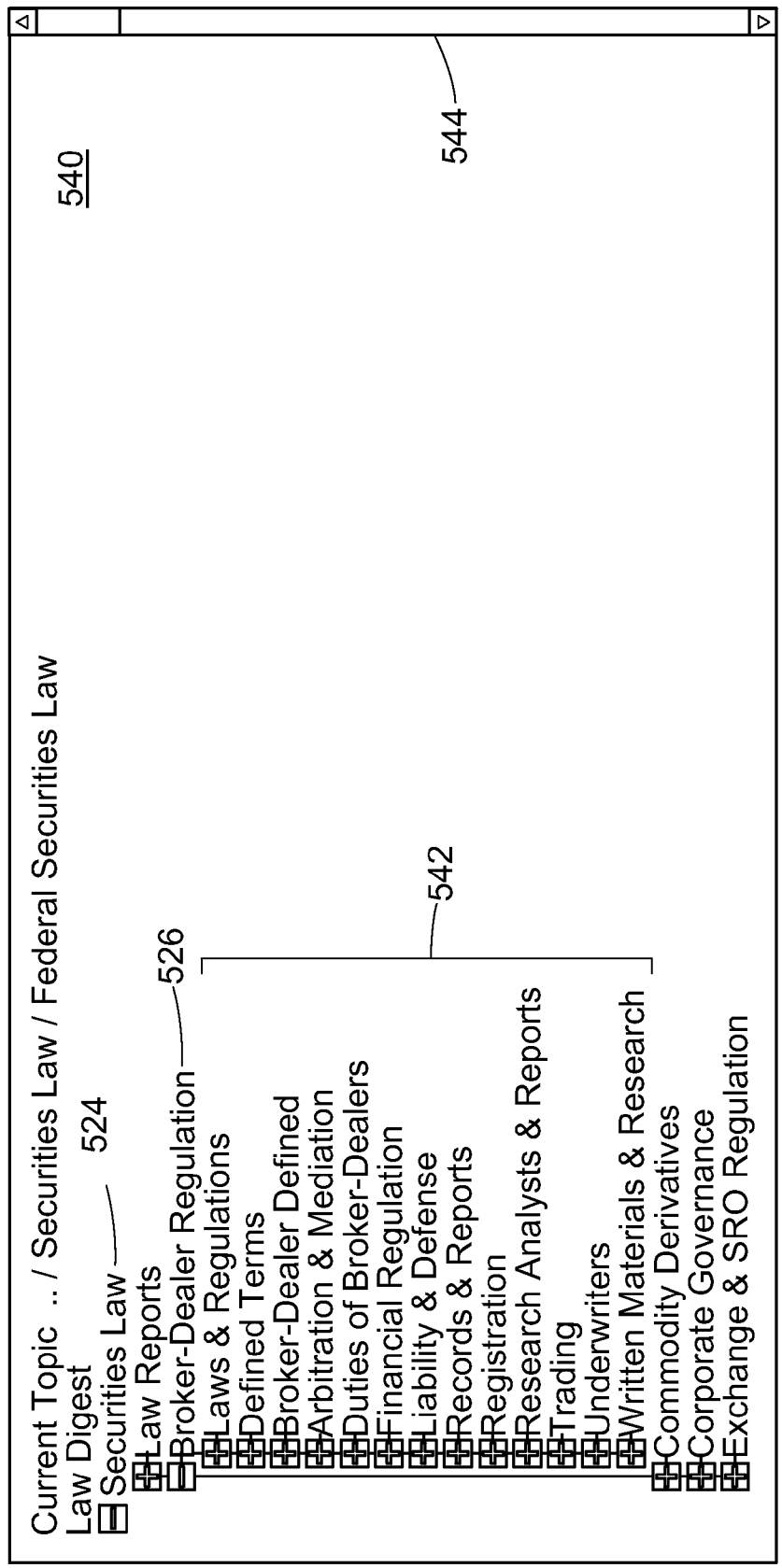

In connection with a display such as the one depicted in FIG. 14, selecting a topic or subtopic that contains further subtopics may cause one more level of subtopics to be displayed under the selected topic or subtopics If the subtopics are already visible, then selecting on the topic may cause all levels of subtopics below the selected topic or subtopic to be hidden.

Figure 15:
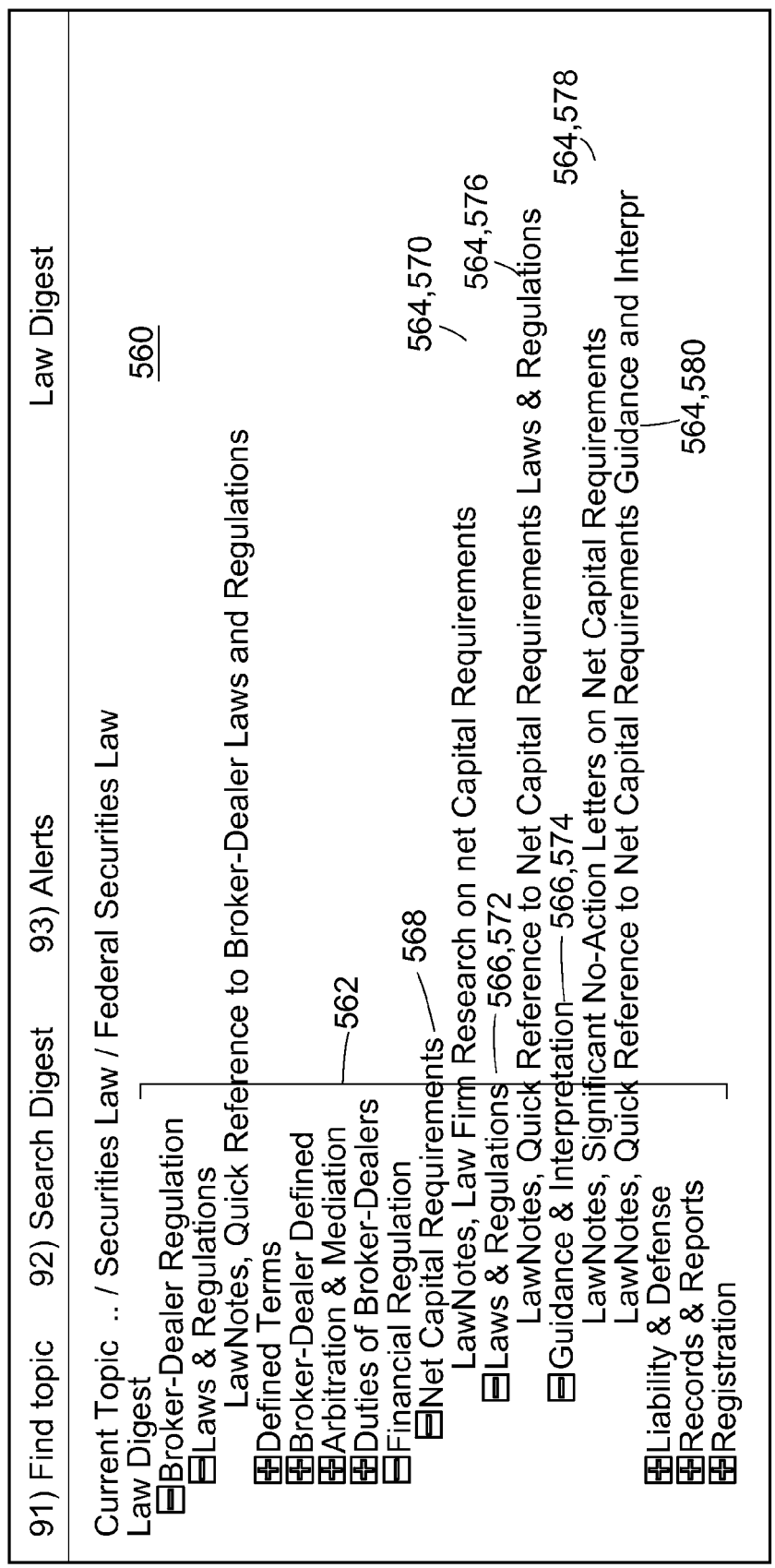

A topic or subtopic may be associated with one or more documents that preferably relate to that topic or subtopics FIG. 15 depicts a window 560 including a portion 562 of a Legal Topic Hierarchy according to an embodiment of the invention. As depicted, some or all topics and/or subtopics may be associated with at least one document called a "Law Note" 564, which relates to the associated topic or subtopics (Law Notes are discussed in more detail below in connection with FIGS. 19-21.)

Any particular topic or subtopic may, depending on the implementation, be associated with one or more documents. In an alternative embodiment of the invention, top-level topics may have no direct associations with any documents, but any subtopic may have documents associated with it, regardless of whether the subtopic itself has subtopics. In connection with an embodiment of the invention, every leaf node 566 of the topic tree is associated with at least one Law Note 564.

For example, as depicted in FIG. 15, the subtopic "Net Capital Requirements" 568 is associated with a Law Note 570 titled "Law Firm Research on Net Capital Requirements." "Net Capital Requirements" 568 also includes two other subtopics, "Laws & Regulations" 572 and "Guidance and Interpretation" 574, which are both leaf nodes. "Laws & Regulations" 572 is associated with a Law Note titled "Quick Reference to Net Capital Requirements Laws & Regulations" 576. "Guidance & Interpretation" 574 is associated with two Law Notes: one titled "Significant No-Action Letters on Net Capital Requirements" 578 and one titled "Quick Reference to Net Capital Requirements Guidance and Interpretation" 580.

As an alternative to the depicted presentation, a topic or subtopic that is associated with at least one Law Note or other document appears with some indicia of the association when the documents themselves are not listed. For example, an asterisk may appear next to a subtopic that has a document associated with it, and selecting that subtopic may cause a list of associated documents to appear. Selecting a subtopic for which a list of associated documents is already displayed may cause that list to be hidden.

Besides possibly being associated with one or more Law Notes, one or more subtopics may also be associated with one or more other documents, e.g., news articles, statutes, or judicial opinions, that relate to the subtopics Selecting a subtopic in such circumstances may cause a list of associated documents of one or more types to appear, and the list may or may not include a Law Note.

Selecting a listed document, such as a Law Note, may cause some or all content of the selected document to be displayed. For example, the display of the content of the document may replace some or all of the display of the Legal Topic Hierarchy and/or appear in a new window displayed on, e.g., a computer monitor. In connection with use of a computer system that comprises and/or is coupled to more than one monitor, the new window, which displays content from the selected document, may, for example, appear on the same monitor as some or all of the Legal Topic Hierarchy, appear on a different monitor, and/or be split between multiple monitors.

A system including an implementation of a Legal Topic Hierarchy may further include a means for it to be customized. Such customization may depend, e.g., on the individual user and/or on the basis of one or more groups that the user is affiliated with. For example, a Legal Topic Hierarchy displayed to an employee of a law firm may include firm-specific material, such as briefs or memoranda. This customization may be done in one or more ways, depending on the embodiment of the invention, including, e.g., by editing digital files stored on one or more computers and/or through a drag-and-drop administrative interface (not pictured).

Any information, including standard and/or customized content, may be stored and provided, e.g., by a server provided by the user, a group that the user is affiliated with, a third party, or some or all of these. When multiple servers are used, some or all of the information may be duplicated on two or more servers. Depending upon the implementation of the Legal Topic Hierarchy, a user may or may not be aware of any distinction between the presentation of standard content and custom content.

Figure 16:
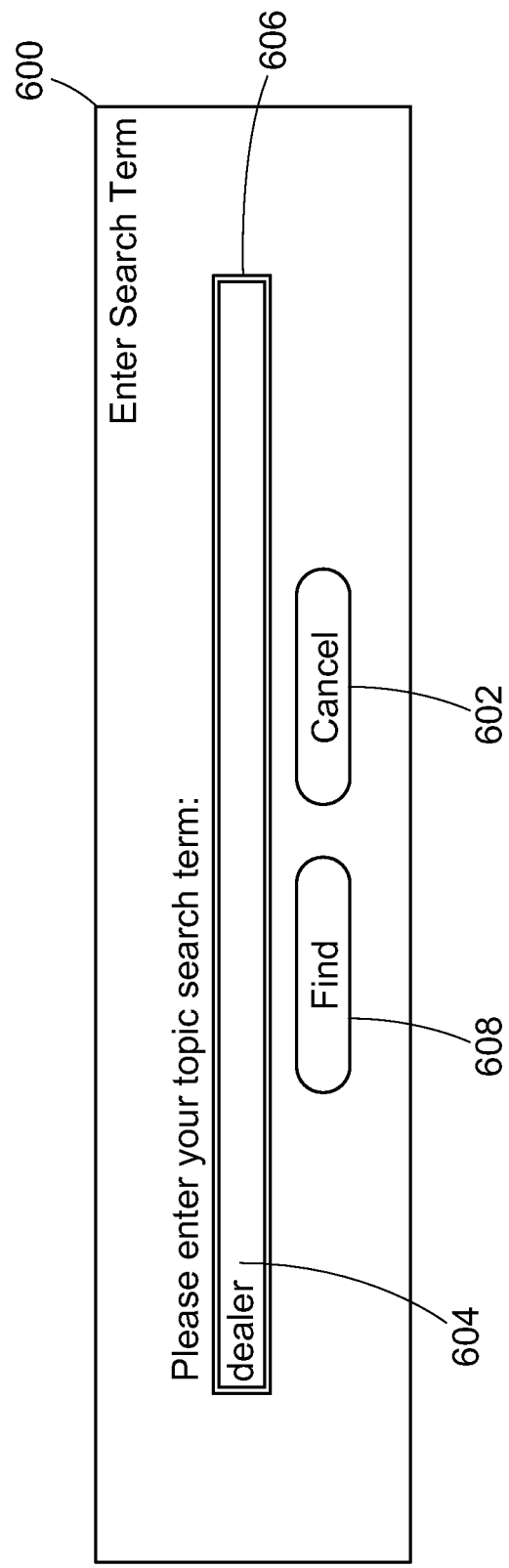
FIGS. 16-18 depict displays such as may be presented in the course of searching within a Legal Topic Hierarchy according to an embodiment of the invention.

As mentioned in connection with FIG. 12, a facility may exist by which a user may search for topics and subtopics that match entered search criteria. For example, selecting the "Find Topic" button 504 (FIG. 12) may cause the display of a window 600 such as the example depicted in FIG. 16. The user may dismiss the window 600 by selecting the button labeled "Cancel" 602.

In connection with the window 600 of FIG. 12, the user can use the find topic command by entering one or more search terms 604, such as "dealer," in the provided text area 606. Selecting the button labeled "find" 608 causes the search to be executed against the Legal Topic Hierarchy.

Figure 17:
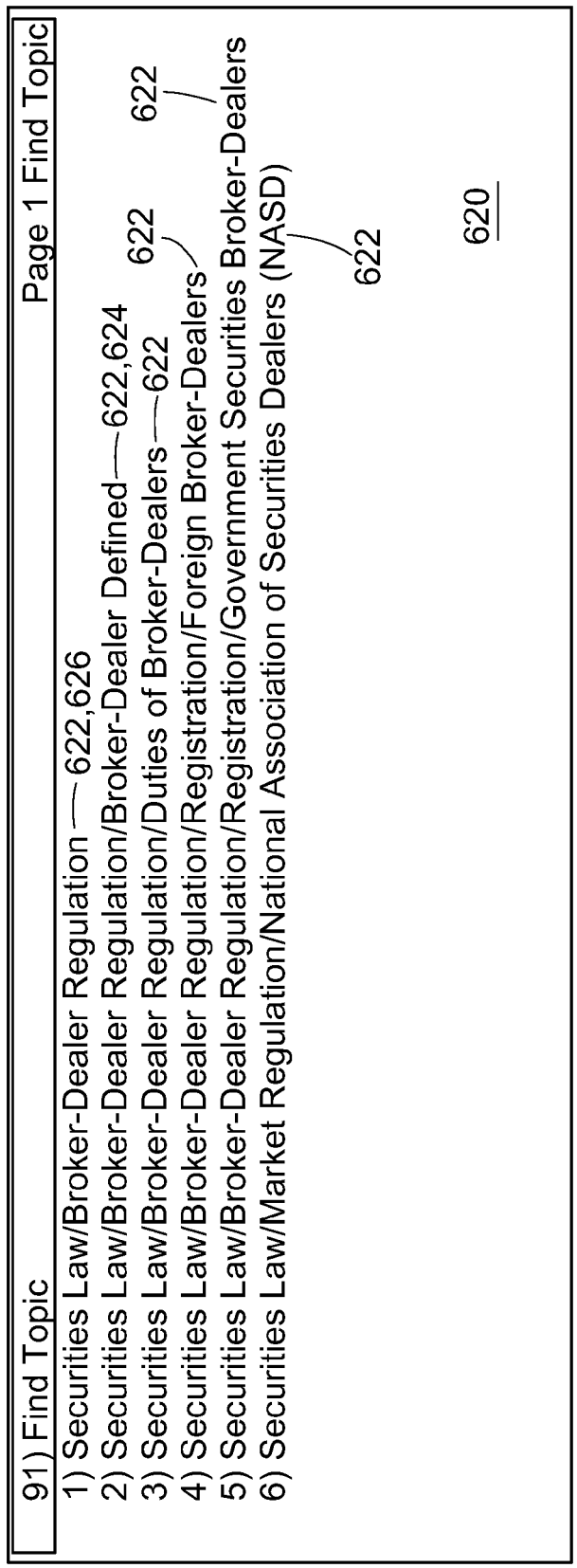

FIG. 17 depicts a window 620 such as may be displayed to present the results of a topic search. As depicted, the search result includes a list of subtopics 622 that match the search term or terms. Also as depicted, each responsive subtopic 622 is presented in terms of the full path through the Legal Topic Hierarchy from the top-level topic to the responsive subtopic 622. For example, the response to a search for the term "dealer" returns several subtopics, including "Broker-Dealer Defined" 624. This is a subtopic of "Broker-Dealer Regulation" 626, which is itself a subtopic of "Securities Law."

Figure 18:
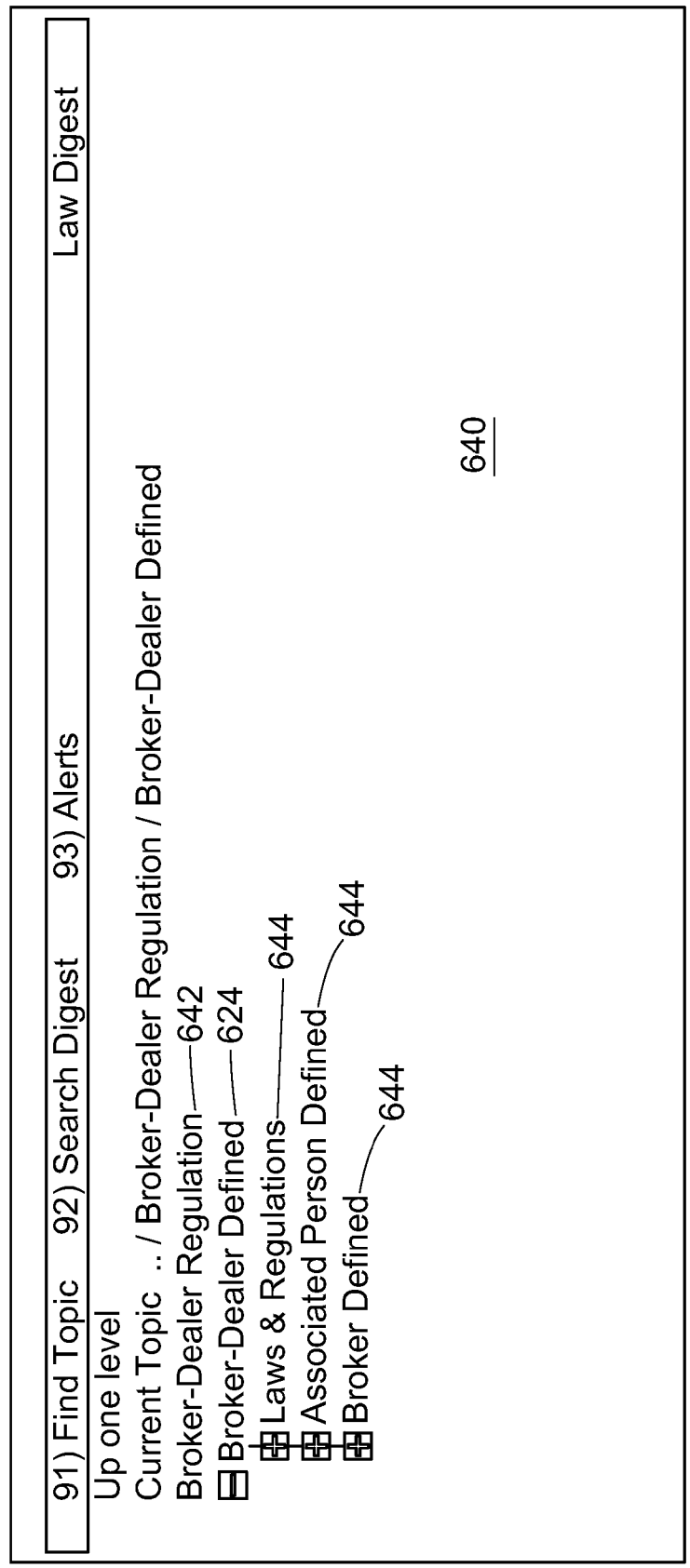

Subtopics 622 in the window 620 may be hyperlinks. Selecting such a hyperlink may cause, e.g., the display of a corresponding portion of the Legal Topic Hierarchy. FIG. 18 depicts such a display 640 that includes the node corresponding to the selected path 624, the selected node's parent 642, and the selected node's children 644, if any.

It may be possible to store and/or share topic searches and/or their results. As an implementation of such functionality, or in addition to it, a user may be able to encode the "find topic" command in a command line or in hyperlink. Such an encoded command may be, e.g., sent as an electronic message, allowing the sender to specify a search and/or a result with relatively little opportunity for ambiguity and/or error.

Law Notes

As discussed above, a topic hierarchy may serve to organize information. For example, the Legal Topic Hierarchy may serve as a framework or outline of legal knowledge. A subtopic within the Legal Topic Hierarchy may be associated with, e.g., a document such as a Law Note referred to above.

In connection with an embodiment of the invention, the term "Law Note" may refer to a document that provides information relevant to one or more matters of law, corresponding to one or more topics and/or subtopics in the Legal Topic Hierarchy. A Law Note may, for example, be prepared by one or more human authors and/or editors. The length of any Law Note may vary depending on, e.g., the subject matter, the type of Law Note (as discussed below), and the depth of coverage.

The content and types of Law Notes associated with the Legal Topic Hierarchy may vary. One exemplary implementation in connection with an embodiment of the invention includes at least three specific kinds of Law Note. The first kind, which may be called a "discussion note," may resemble a case law annotation or a section of a legal treatise in that it reviews and analyzes a specific legal topic. The discussion commonly cites authorities-including, for example, judicial decisions, statutes, and regulatory rulings-that are relevant to the topic, analyzing some in detail and preferably citing others, e.g., from as many others as possible while keeping within reasonable limits both the length of the Law Note and the amount of effort required to prepare it. Under each legal point, citations are broken down by jurisdiction.

FIG. 19 depicts a window 660 within which a discussion note 662 may be presented in accordance with an embodiment of the invention. As depicted, titles 664 of authorities (e.g., judicial opinions) and/or citations to them may be hyperlinks. When selected, such a hyperlink may lead, e.g., to the cited authority and/or further information related to it. The existence of a hyperlink may be indicated, e.g., by highlighting and/or underlining.

Figure 20:
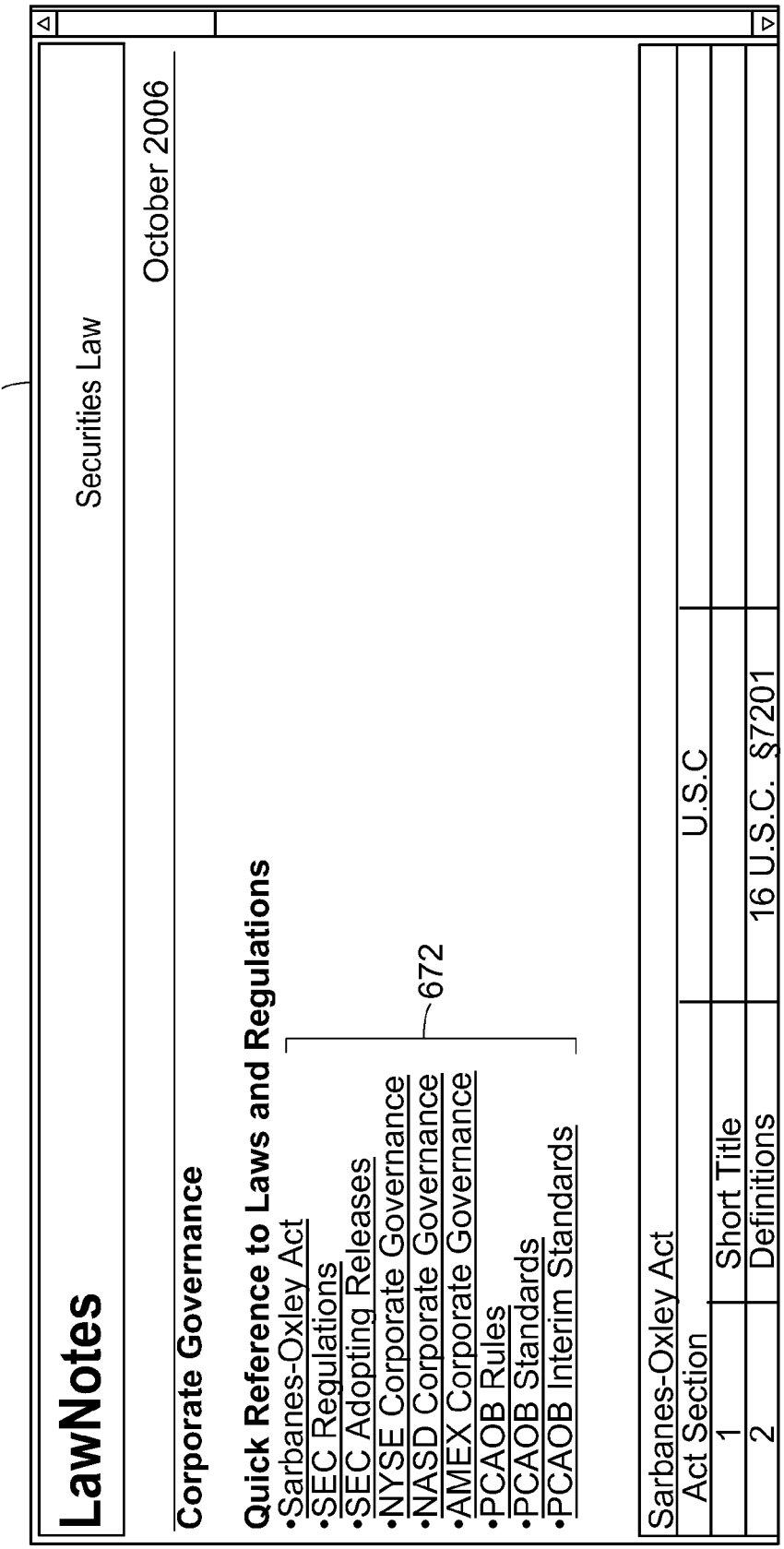
FIG. 20 depicts a law list Law Note according to an embodiment of the invention.

The second kind of Law Note included in the exemplary implementation is displayed within the window 670 depicted in FIG. 20. The Law Note, which may be referred to a "law list," comprises references 672 to authorities that are relevant to the topic of the note. As with a discussion note, references may be hyperlinked citations that lead to the respective cited authorities.

The third kind of Law Note included in the exemplary implementation is displayed within the window 680 depicted in FIG. 21. The depicted Law Note, which may be referred to as a "directory," comprises a classified list of further references relevant to the topic of the note. As with the other kinds of Law Notes, some or all listed references are accompanied by a description of the reference, its relevance or both.

For example, as depicted in FIG. 21, the window 680 displays a portion of a directory note 682. As depicted, the directory note 682 does not fit in the viewing area of the window 680, and a scroll bar 684 is provided, enabling the user to select which portion of the directory note 682 will be displayed. The depicted directory note 682 comprises headings 686, under which references 688 to documents are collected. For example, as depicted, Regulation AC 690 and Regulation BTR 692 of the U.S. Securities and Exchange Commission ("SEC") appear under the descriptive heading "SEC Regulations" 694. The next heading, "SEC Adopting Releases" 696, collects references to documents that express the adoption by the SEC of changes to rules that relate to the subject matter of the directory note 682. For example, FIG. 21 depicts a reference 698 to a rulemaking related to the National Association of Securities Dealers, the New York Stock Exchange, and governance of corporations whose shares trade in those markets.

As depicted in FIG. 21, a reference 688 to a document in a directory note 376825 may include, e.g., a title and/or description of the document 690 and a citation 692 that may be used to identify the document. Preferably, a citation 692 is also a hyperlink to the cited document or other resource and is displayed, e.g., highlighted and/or underlined, to indicate that it is a hyperlink. A reference may include and/or be associated with other information in addition to and/or instead of some or all of the information depicted in FIG. 21, and, depending on the implementation, this other information may comprise a hyperlink to some resource.

Ecosystem Search

Interrelationships between documents in a collection of documents may be used to define a subset of the collection, within which a user may search for and/or within documents. Because the subset is defined by the interrelationships between the documents, the subset is sometimes called an "ecosystem." In one implementation, the interrelationships are citations from one document to another; it may be inferred that if one document cites another, then the two documents may refer to at least one common topic.

Searching with a collection defined at least in part by citations between and among documents in the collection is discussed in detail in the related, commonly-owned, pending U.S. patent application Ser. No. 11/412,315, filed Apr. 26, 2006, and titled "System and Method for Topical Document Searching," which has been incorporated herein by reference.

In this context, an ecosystem includes the idea of an ecosystem "level," which relates to the expansiveness of the definition of the ecosystem. A level 0 search may, for example, look for specified keywords only in the text of one or more specified documents or parts of documents. But the source documents may cite other documents, and it may be inferred that the cited documents are themselves likely to be relevant to the same topics as the source documents. Thus, continuing the previous example, a level 1 search may look for keywords in the text of the source documents and in the text of each document that any of the source documents cites. The set of searched documents may be expanded iteratively in the same way.

The idea of an ecosystem level permits a precise definition of searchable ecosystems using the language of mathematical induction. Let a level 0 ecosystem be defined to be the set of one or more documents (or parts of documents) within a larger collection of documents, some or all of which cite other documents in the collection. Then, given the level N ecosystem, where N is a non-negative integer, the level (N+1) ecosystem is defined as the union of the set of documents in the level N ecosystem and the set of all documents in the collection that are cited by any document in the level N ecosystem.

Depending on the collection of documents, there may be one or more ecosystems such that the level N ecosystem is identical to the level (N+1) ecosystem for all N above a certain limit. In other words, once a certain level is reached, every document that is cited within the ecosystem is itself already contained in the ecosystem. In such a case, the level N ecosystem may be said to be exhaustive.

In some circumstances, e.g., when applied to certain fields of knowledge and/or certain collections of documents, increasing the level of the ecosystem beyond a certain point may decrease the topical focus of the ecosystem. In such circumstances, long chains of citations may dilute the relevance of newly-added documents to the original document. In one preferred implementation, for example, which uses Law Notes as the basis for defining a searchable ecosystem within a database of legal materials, a user may choose to search within ecosystems of levels 0, 1, or 3.

Once an ecosystem has been defined, a search (such as a keyword search) within the ecosystem will return the document or documents within the ecosystem that satisfy the search criteria.

I claim:

1. A method of displaying an entry in a citation index for a cited document cited in at least one citing document, the entry corresponding to at least one citation in the at least one citing document that comprises text, the at least one citation identifying the cited document and being introduced in the text of the at least one citing document by a signal, the method comprising: retrieving from a computer-readable storage medium first information that identifies the at least one citing document and second information that identifies the signal in the at least one citing document that introduced the citation to the cited document; and causing an electronic display device to display the entry, the entry being based on the first information and the second information and comprising identification of the citing document and identification of the signal.

2. The method of claim 1, wherein the entry comprises the signal.

3. A system for displaying an entry in a citation index for a cited document cited in at least one citing document, the entry corresponding to at least one citation in the at least one citing document that comprises text, at least one of the citations identifying the cited document and being introduced in the text of the at least one citing document by a signal, the system comprising: a programmable processor, a memory coupled to the processor, a computer-readable storage medium, and an electronic display device; the memory storing instructions that, when executed by the processor, cause the system to carry out a method that comprises retrieving from the computer-readable storage medium first information that identifies the at least one citing document and second information that identifies the signal in the at least one citing document that introduced the citation to the cited document; and causing an electronic display device to display the entry, the entry being based on the first information and the second information and comprising identification of the at least one citing document and identification of the signal.

4. The system of claim 3, wherein the entry comprises the signal.

5. The method of claim 1, comprising retrieving from the computer-readable storage medium an excerpt in the at least one citing document which includes a citation of the cited document and displaying the excerpt in association with the displayed identification of the at least one citing document.

6. The system of claim 3, wherein the method carried out by the at least one processor comprises comprising retrieving from the computer-readable storage medium an excerpt in the at least one citing document which includes a citation of the cited document and displaying the excerpt in association with the displayed identification of the at least one citing document.

* * * * *